United States Patent
Ikemi et al.

(10) Patent No.: US 10,770,706 B2
(45) Date of Patent: Sep. 8, 2020

(54) BINDER FOR ELECTRICITY STORAGE DEVICE AND BINDER COMPOSITION FOR ELECTRICITY STORAGE DEVICE

(71) Applicant: ASAHI KASEI KABUSHIKI KAISHA, Tokyo (JP)

(72) Inventors: Masatoshi Ikemi, Tokyo (JP); Hiroshi Miyazawa, Tokyo (JP)

(73) Assignee: ASAHI KASEI KABUSHIKI KAISHA, Tokyo (JP)

(*) Notice: Subject to any disclaimer, the term of this patent is extended or adjusted under 35 U.S.C. 154(b) by 215 days.

(21) Appl. No.: 15/760,349

(22) PCT Filed: Nov. 8, 2016

(86) PCT No.: PCT/JP2016/083131
§ 371 (c)(1),
(2) Date: Mar. 15, 2018

(87) PCT Pub. No.: WO2017/086215
PCT Pub. Date: May 26, 2017

(65) Prior Publication Data
US 2018/0261815 A1  Sep. 13, 2018

(30) Foreign Application Priority Data

Nov. 19, 2015 (JP) ................................. 2015-226598

(51) Int. Cl.
*H01M 2/16* (2006.01)
*C08F 220/28* (2006.01)
(Continued)

(52) U.S. Cl.
CPC .......... *H01M 2/166* (2013.01); *C08F 220/18* (2013.01); *C08F 220/28* (2013.01); *C08K 3/22* (2013.01);
(Continued)

(58) Field of Classification Search
CPC ............................. H01M 2/166; C08F 220/18
(Continued)

(56) References Cited

U.S. PATENT DOCUMENTS

2008/0003506 A1   1/2008  Suzuki et al.
2013/0330590 A1* 12/2013  Toyoda ............... H01M 2/1653
                                                                        429/142
(Continued)

FOREIGN PATENT DOCUMENTS

EP          3067974 A1    9/2016
JP       2001-176483 A    6/2001
(Continued)

OTHER PUBLICATIONS

English translation of International Search Report dated Jan. 17, 2017, in PCT International Application No. PCT/JP2016/083131.
(Continued)

*Primary Examiner* — James M Erwin
(74) *Attorney, Agent, or Firm* — Birch, Stewart, Kolasch & Birch, LLP

(57) ABSTRACT

A binder for an electricity storage device comprising a copolymer having an ethylenic unsaturated monomer having a polyalkyleneglycol group (P) as a monomer unit, wherein the average number of repeating units (n) of polyalkyleneglycol groups of the ethylenic unsaturated monomer having a polyalkyleneglycol group (P) is 3 or greater.

20 Claims, 1 Drawing Sheet

(51) Int. Cl.
*C08L 33/14* (2006.01)
*C08F 220/18* (2006.01)
*H01M 4/62* (2006.01)
*H01M 10/42* (2006.01)
*C08K 3/22* (2006.01)
*H01M 10/0525* (2010.01)

(52) U.S. Cl.
CPC .......... *C08L 33/14* (2013.01); *H01M 2/1646* (2013.01); *H01M 2/1653* (2013.01); *H01M 4/622* (2013.01); *H01M 10/4235* (2013.01); *C08F 220/286* (2020.02); *C08F 2800/20* (2013.01); *C08K 2003/2227* (2013.01); *H01M 10/0525* (2013.01)

(58) Field of Classification Search
USPC .......................................................... 429/251
See application file for complete search history.

(56) References Cited

U.S. PATENT DOCUMENTS

| | | | |
|---|---|---|---|
| 2015/0240039 A1* | 8/2015 | Katsuda | H01G 11/52 429/214 |
| 2015/0372305 A1 | 12/2015 | Matsuo et al. | |
| 2016/0079007 A1 | 3/2016 | Otsuka et al. | |

FOREIGN PATENT DOCUMENTS

| | | |
|---|---|---|
| JP | 2001-332265 A | 11/2001 |
| JP | 2003-268053 A | 9/2003 |
| JP | 5708872 B1 | 3/2015 |
| JP | 2015-61900 A | 4/2015 |
| JP | 2015-135773 A | 7/2015 |
| WO | WO 2006/033173 A1 | 3/2006 |
| WO | WO 2014/119481 A1 | 8/2014 |
| WO | WO 2014/157715 A1 | 10/2014 |
| WO | WO 2015/064570 A1 | 5/2015 |

OTHER PUBLICATIONS

English translation of Written Opinion of the International Searching Authority dated Jan. 17, 2017, in PCT International Application No. PCT/JP2016/083131.
International Preliminary Report on Patentability (Form PCT/IB/373) dated May 22, 2018, in PCT International Application No. PCT/JP2016/083131.
Notification of Transmittal of the Translation of the International Preliminary Report on Patentability (Form PCT/IB/338) dated May 31, 2018, in PCT International Application No. PCT/JP2016/083131.
Supplementary European Search Report for European Application No. 16866217.9, dated Sep. 28, 2018.

* cited by examiner

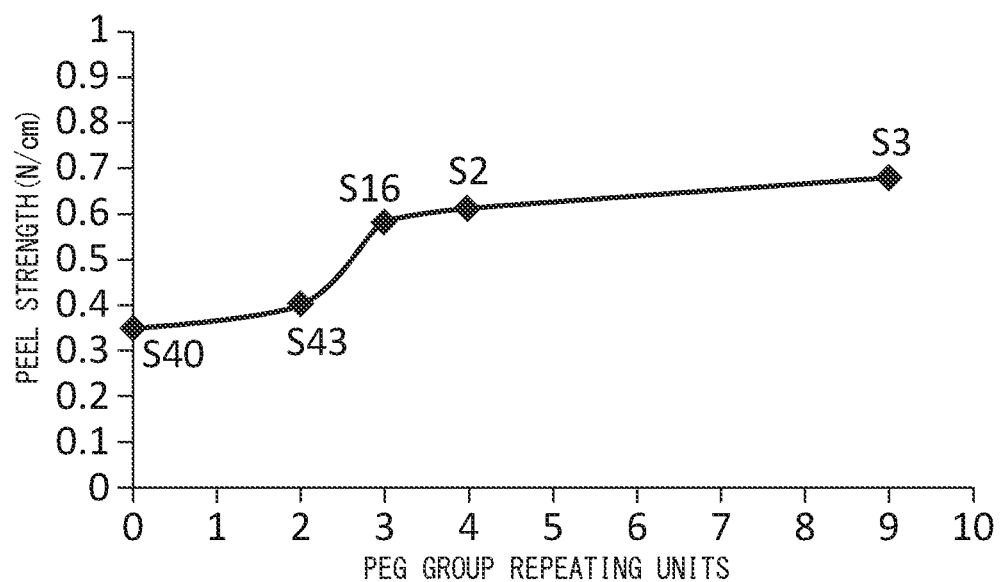

BINDER FOR ELECTRICITY STORAGE DEVICE AND BINDER COMPOSITION FOR ELECTRICITY STORAGE DEVICE

TECHNICAL FIELD

The present invention relates to a binder for an electricity storage device, and to a binder composition for an electricity storage device.

BACKGROUND ART

Electricity storage devices such as lithium-ion secondary batteries have been undergoing active development in recent years. An electricity storage device is usually designed with a microporous film (separator) between positive and negative electrodes. The separator has the function of preventing direct contact between the positive and negative electrodes, while also allowing ions to pass through the electrolyte solution that is held in the micropores.

A separator having a layer comprising an inorganic filler and a resin binder (hereunder also referred to as "porous layer" or "filler porous layer") disposed on the surface of a separator base material has been proposed, with the purpose of imparting various properties to the separator while ensuring electrical characteristics and safety when used in a lithium-ion secondary battery (PTL 1).

PTL 1 describes coating the separator with a resin composition containing an inorganic filler and polymer particles formed from a first monomer with an acidic functional group, a second monomer with an amide group and a third monomer with a polyoxyalkylene group, to form a protective layer on the separator (see Synthesis Example 6, Formulation Example 6 and Example 16).

Polyalkyleneglycol groups have been known in the prior art as functional groups that increase solid electrolyte ion permeability, and such groups are commonly used in an organic solvent if they are to be incorporated into a copolymer for a non-aqueous electrolyte solution. Emulsion polymerization is the common method employed to obtain aqueous copolymers. When polyalkyleneglycol groups are incorporated into an aqueous copolymer, because polyalkyleneglycol groups are hydrophilic, if used in large amounts they can cause problems such as preventing formation of a particulate copolymer aqueous dispersion or interfering with removal of water in the drying step, during emulsion polymerization. In addition, since the separator base material, which is typically a polyolefin microporous film, has the property of contracting when heated, it is difficult to carry out heat drying at 100° C. or higher during formation of the electrode active material layer, and removal of the water must be carried out at low temperature.

CITATION LIST

Patent Literature

[PTL 1] Japanese Patent Publication No. 5708872

DISCLOSURE OF THE INVENTION

Problems to be Solved by the Invention

PTL 1 describes coating a negative electrode or a separator with a resin composition including an inorganic filler and polymer particles formed from a first monomer with an acidic functional group, a second monomer with an amide group and a third monomer with a polyalkyleneglycol group, to form a protective layer on the negative electrode or separator. The third monomer composing the polymer particles is methoxypolyethyleneglycol methacrylate (MOEMA) having a molecular weight of about 200, and the average number of repeating units (n) of the ethylene glycol units in the MOEMA is approximately 2, calculated based on molecular weight (Synthesis Example 6, Formulation Example 6 and Example 16).

The polymer particles described in PTL 1 function for spot bonding between the inorganic filler in the resin composition, forming a protective layer for the separator, but the separator described in PTL 1 still has room for improvement from the viewpoint of both rate characteristic and safety of electricity storage devices.

In light of these circumstances, it is an object of the present invention to provide a binder for an electricity storage device and a binder composition for an electricity storage device, that have excellent adhesion and ion permeability, as well as an electricity storage device such as a lithium-ion secondary battery using the same, that exhibits excellent battery characteristics.

Means for Solving the Problems

The present inventors have found that the problem can be solved by the following technical means, and the invention has thereupon been completed. Specifically, the present invention provides the following.

[1] A binder for an electricity storage device comprising a copolymer having an ethylenic unsaturated monomer having a polyalkyleneglycol group (P) as a monomer unit, wherein the average number of repeating units (n) of polyalkyleneglycol groups of the ethylenic unsaturated monomer having a polyalkyleneglycol group (P) is 3 or greater.

[2] The binder for an electricity storage device according to [1] above, wherein the copolymer has, as monomer units, 2 to 50 weight % of the ethylenic unsaturated monomer having a polyalkyleneglycol group (P) and a monomer without a polyalkyleneglycol group that is copolymerizable with the ethylenic unsaturated monomer having a polyalkyleneglycol group (P), with respect to 100 weight % of the copolymer.

[3] The binder for an electricity storage device according to [1] above, wherein the copolymer has, as monomer units, 10 to 50 weight % of the ethylenic unsaturated monomer having a polyalkyleneglycol group (P) and a monomer without a polyalkyleneglycol group that is copolymerizable with the ethylenic unsaturated monomer having a polyalkyleneglycol group (P), with respect to 100 weight % of the copolymer.

[4] The binder for an electricity storage device according to [2] or [3] above, wherein the monomer without a polyalkyleneglycol group comprises at least one monomer selected from the group consisting of ethylenic unsaturated monomers with a carboxyl group (b1), ethylenic unsaturated monomers with an amide group (b2) and ethylenic unsaturated monomers with a hydroxyl group (b3), at 0.1 to 10 weight % with respect to 100 weight % of the copolymer.

[5] The binder for an electricity storage device according to any one of [2] to [4] above, wherein the monomer without a polyalkyleneglycol group comprises a crosslinkable monomer (b4).

[6] The binder for an electricity storage device according to any one of [1] to [5] above, wherein the monomer without a polyalkyleneglycol group comprises an ethylenic unsaturated monomer with a cycloalkyl group (A) and a (meth) acrylic acid ester monomer (b5), the (meth)acrylic acid ester monomer (b5) is a (meth) acrylic acid ester monomer comprising an alkyl group of 4 or more carbon atoms and a (meth)acryloyloxy group, and the total content ratio of the ethylenic unsaturated monomer with a cycloalkyl group (A) and the (meth)acrylic acid ester monomer (b5) is 50 to 98 weight % with respect to 100 weight % of the copolymer.

[7] The binder for an electricity storage device according to [6] above, wherein the (meth)acrylic acid ester monomer (b5) is a (meth)acrylic acid ester monomer comprising an alkyl group of 6 or more carbon atoms and a (meth) acryloyloxy group.

[8] The binder for an electricity storage device according to [6] or [7] above, wherein the ethylenic unsaturated monomer with a cycloalkyl group (A) is cyclohexyl acrylate or cyclohexyl methacrylate.

[9] The binder for an electricity storage device according to any one of [1] to [8] above, wherein the binder for an electricity storage device is a binder for formation of a filler porous layer.

[10] A slurry for formation of a filler porous layer for an electricity storage device, comprising water, the binder for formation of a filler porous layer according to [9] above, and an inorganic filler.

[11] A filler porous layer for an electricity storage device, comprising the binder for formation of a filler porous layer according to [9] above, and an inorganic filler.

[12] A separator for an electricity storage device, having the filler porous layer for an electricity storage device according to [11] above.

[13] A separator for an electricity storage device, comprising the filler porous layer for an electricity storage device according to [11] above, and a polyolefin porous base material.

[14] A lithium-ion secondary battery, comprising the filler porous layer for an electricity storage device according to [11] above.

[15] The binder for an electricity storage device according to any one of [1] to [8] above, wherein the binder for an electricity storage device is a binder for an electrode.

Effect of the Invention

According to the invention there is provided a binder for an electricity storage device and a binder composition for an electricity storage device, that have excellent adhesion and ion permeability, as well as an electricity storage device such as a lithium-ion secondary battery using the same, that exhibits excellent battery characteristics. By producing an electricity storage device such as a lithium-ion secondary battery using a binder according to an embodiment of the invention it is possible to drastically improve the battery characteristic.

BRIEF DESCRIPTION OF THE DRAWINGS

FIG. 1 is a graph representing peel strength (N/cm) of the coating layer with respect to number of repeating units of PEG groups, for representative separators in the examples.

DESCRIPTION OF EMBODIMENTS

<Binder for Electricity Storage Device>

The binder for an electricity storage device of the invention comprises a copolymer having an ethylenic unsaturated monomer having a polyalkyleneglycol group as a monomer unit, wherein the average number of repeating units (n) of polyalkyleneglycol groups of the ethylenic unsaturated monomer having a polyalkyleneglycol group is 3 or greater.

The binder for an electricity storage device of the invention having the construction described above thereby exhibits excellent adhesion, and an effect of reduced ion resistance of the binder itself, and as a result it can improve battery characteristics. In addition, since the amount of binder in the electrode can be increased while minimizing increase in ion resistance, it is possible to reduce shedding or cracking of the active material layer during battery assembly and destruction of the active material layer due to charge-discharge, while an effect is also exhibited for long-term battery characteristics and safety.

The binder for an electricity storage device of the invention can be used as a separator or as an electrode in an electricity storage device. When the binder for an electricity storage device is used as an electrode in an electricity storage device, it may also be referred to herein as a "binder for an electrode". The binder for an electrode can be applied in either or both a positive electrode and/or a negative electrode.

[Copolymer (PEU-Containing Thermoplastic Copolymer)]

The copolymer in the binder for an electricity storage device of the invention has the ethylenic unsaturated monomer having a polyalkyleneglycol group (P) as a monomer unit. The term "ethylenic unsaturated monomer" referred to here means a monomer with one or more ethylenic unsaturated bonds in the molecule.

A copolymer with an ethylenic unsaturated monomer having a polyalkyleneglycol group (also referred to as "polyoxyalkylene group") as a monomer unit is a thermoplastic copolymer having a polyether unit (also abbreviated hereunder as "PEU") in the structure (such a copolymer will hereunder be referred to as "PEU-containing thermoplastic copolymer").

The oxygen atoms in the polyalkyleneglycol group of the PEU-containing thermoplastic copolymer coordinate with lithium (Li) ions and promote diffusion of Li ions, and are therefore effective for improving the ion permeability of the electrode and separator.

Because the polyalkyleneglycol groups of the PEU-containing thermoplastic copolymer have high hydrating power, coating the PEU-containing thermoplastic copolymer as an aqueous coating material on the base material of the separator or the collector of the electrode tends to help prevent rapid drying of the PEU-containing thermoplastic copolymer, ensure coatability for the aqueous coating material and increase the bonding strength between the base material and the coating layer.

An ethylenic unsaturated monomer having an average number of repeating units of polyalkyleneglycol groups of 3 or greater will be copolymerizable with the monomer without a polyalkyleneglycol group. Polyoxyalkylene groups are also known as oxyalkylene groups, and examples include oxymethylene, oxyethylene, oxypropylene and oxybutylene. The number of carbon atoms of the oxyalkylene group is preferably 1 to 6, more preferably 1 to 3 and even more preferably 2. The hydrocarbon group in a polyoxyalkylene group may be either straight-chain or branched.

The average number of repeating units (n) of polyalkyleneglycol groups in the ethylenic unsaturated monomer having a polyalkyleneglycol group (P) is preferably 3 or greater. If the average number of repeating units (n) is at least 3, the ion permeability of the copolymer and the peel strength of the coating layer will tend to be higher. From the viewpoint of both the rate characteristic and safety of electricity storage devices, the average number of repeating units (n) is preferably no greater than 100, more preferably no greater than 30, even more preferably no greater than 23, yet more preferably no greater than 15 and most preferably no greater than 8. If the average number of repeating units (n) is no greater than 8, the copolymerizability with the monomer without a polyalkyleneglycol group will be higher in emulsion polymerization.

While it is not our intention to be limited to any particular theory, presumably if the PEU-containing thermoplastic copolymer has the ethylenic unsaturated monomer (P) with a polyalkylene glycol chain with an average number of repeating units (n) of 3 or greater as a monomer unit, then the binder for an electricity storage device of the invention will be able to have lower ion resistance compared to a conventional acrylic binder, and when the binder for an electricity storage device of the invention is used in a filler porous layer or an electrode active material layer, their strength and powder falling property or flexibility can be improved. As a result, increased ion resistance can be minimized even when the amount of binder for an electricity storage device in the filler porous layer is increased, thereby reducing the need to sacrifice battery characteristics such as the electrode rate characteristic. In addition, not only is it possible to minimize increase in ion resistance even when the amount of active material is increased in order to increase the volume, but it is also possible to minimize destruction of the active material layer by expansion and contraction of the electrode due to the high flexibility of the layer, thus it is also possible to retain the battery characteristics over a long period of time.

While the present invention is not limited by the following theory, the inventors believe the PEU-containing thermoplastic copolymer can improve the dispersibility of the slurry comprising the inorganic filler or electrode active material and the binder for an electricity storage device of the invention, due to the surfactancy of the polyalkylene glycol chains with an average number of repeating units (n) of 3 or greater. As a result, a uniform inorganic coating layer is formed on the separator base material, thereby increasing the peel strength of the coating layer while also allowing the bindability between the polyolefin base material and the inorganic coating layer to be increased, and allowing the safety of the electricity storage device to be improved. Furthermore, when the binder for an electricity storage device of the invention is used in an electrode, the bindability with the collector is excellent due to the uniform dispersion of the active material and binder, and the safety and battery characteristics can be improved. Thus, the binder for an electricity storage device of the invention presumably contributes to both the rate characteristic and safety of the electricity storage device.

Examples for the ethylenic unsaturated monomer (P) having a polyoxyalkylene group include polyalkyleneglycol mono(meth)acrylate, polyalkyleneglycol di(meth)acrylate, and monomers having reactive substituents such as polyalkyleneglycol groups and allyl groups in the molecule. As used herein, the term "(meth)acryl" means "acryl" and its corresponding "methacryl", the term "(meth)acrylate" means "acrylate" and its corresponding "methacrylate", and the term "(meth)acryloyl" means "acryloyl" and its corresponding "methacryloyl".

Examples of polyalkyleneglycol mono(meth)acrylates include (meth)acrylic acid ester monomers with polyalkyleneglycol groups, such as polyethyleneglycol (meth)acrylate, polypropyleneglycol (meth)acrylate, polyethyleneglycol-polypropylene glycol (meth)acrylate, polyethyleneglycol-polybutylene glycol (meth)acrylate, polypropyleneglycol-polybutyleneglycol (meth)acrylate, 2-ethylhexylpolyethyleneglycol mono(meth)acrylate, phenoxydiethyleneglycol mono(meth)acrylate, phenoxypolyethyleneglycol mono(meth)acrylate, methoxypolyethylene glycol (meth)acrylate, methoxydiethyleneglycol mono (meth)acrylate, ethoxypolyethylene glycol (meth)acrylate, butoxypolyethylene glycol (meth)acrylate, octoxypolyethylene glycol (meth)acrylate, lauroxypolyethylene glycol (meth)acrylate, stearoxypolyethylene glycol (meth)acrylate, phenoxypolyethylene glycol (meth)acrylate, methoxypolypropylene glycol (meth)acrylate and octoxypolyethylene glycol-polypropylene glycol (meth)acrylate, these being preferred from the viewpoint of more effectively and reliably solving the problem of the invention.

In addition to these, monomer (P) also includes compounds that are reactive surfactants with polyalkyleneglycol groups, listed in the following paragraphs.

Methoxydiethyleneglycol mono(meth)acrylate, methoxypolyethyleneglycol mono(meth)acrylate, butoxypolyethyleneglycol mono(meth)acrylate, 2-ethylhexylpolyethyleneglycol mono(meth)acrylate and methoxypolypropyleneglycol mono(meth)acrylate are preferred as the monomer (P), from the viewpoint of satisfactory polymerization stability during preparation of the copolymer.

Polyalkyleneglycol di(meth)acrylates include polyethyleneglycol di(meth)acrylate, polypropyleneglycol di(meth) acrylate and polyethylene glycol-polypropyleneglycol di(meth)acrylate.

Examples of monomers with a polyalkyleneglycol group and an allyl group in the molecule include polyalkyleneglycol monoallyl ethers, and specifically polyethyleneglycol monoallyl ether or polypropyleneglycol monoallyl ether may be used.

From the viewpoint of rate characteristic and safety of the electricity storage device, the lower limit for the content ratio (copolymerization ratio) of the ethylenic unsaturated monomer (P) having a number of repeating units (n) of polyalkyleneglycol groups of 3 or greater is preferably 2 weight % or greater, more preferably 5 weight % or greater and even more preferably 10 weight % or greater, with respect to 100 weight % of the copolymer. The upper limit is preferably no greater than 50 weight %, more preferably no greater than 40 weight %, even more preferably no greater than 30 weight % and yet more preferably no greater than 20 weight %. The content ratio of the ethylenic unsaturated monomer having a polyalkyleneglycol group (P) is preferably within this range as this will increase the ion permeability of the separator. Since the dispersibility of the filler and binder in the slurry are improved, it is not only possible to form a uniform coating layer with satisfactory coating layer strength, but the effect of the polyalkyleneglycol group also tends to increase the bindability between the base material and the coating layer. The content ratio of the ethylenic unsaturated monomer having a polyalkyleneglycol group (P) is also preferably no greater than 50 weight % as this will improve the copolymerizability in emulsion polymerization and the stability during neutralization of the aqueous dispersion. If copolymerization is incomplete, generation of released substances may occur, depending on the conditions.

From the viewpoint of both the rate characteristic and safety of the electricity storage device, the copolymer of this embodiment is preferably designed so as to comprise, as copolymerizing components, the ethylenic unsaturated monomer (P) having an average number of repeating units (n) of polyalkylene glycol chains of 3 or greater, and the monomer without a polyalkyleneglycol group.

Examples for the monomer without a polyalkyleneglycol group include (meth)acrylate monomers having cyclic groups. A (meth)acrylate monomer having a cyclic group is preferred from the viewpoint of increasing copolymerizability with the monomer (P).

Among monomers without polyalkyleneglycol groups, the copolymer of this embodiment preferably has an ethylenic unsaturated monomer with a cycloalkyl group (A) as a monomer unit. The ethylenic unsaturated monomer with a cycloalkyl group (A) is a monomer that is different from the monomer (P).

The ethylenic unsaturated monomer with a cycloalkyl group (A) is not particularly restricted and may be one having a cycloalkyl group, and having one ethylenic unsaturated bond. Specific examples for the ethylenic unsaturated monomer with a cycloalkyl group (A) include (meth)acrylic acid ester monomers with cycloalkyl groups, such as cyclohexyl acrylate, cyclohexyl methacrylate, isobornyl acrylate, isobornyl methacrylate, adamantyl acrylate and adamantyl methacrylate, from the viewpoint of more effectively and reliably solving the problem of the invention.

The ethylenic unsaturated monomer with a cycloalkyl group (A) is more preferably a (meth)acrylic acid ester monomer comprising a cycloalkyl group and a (meth)acryloyloxy group. The number of carbon atoms composing the alicyclic ring of the cycloalkyl group is preferably 4 to 8, more preferably 6 or 7, and most preferably 6. The cycloalkyl group may be either substituted or unsubstituted. Examples of substituents include methyl and tertiary butyl groups. Cyclohexyl acrylate and cyclohexyl methacrylate are preferred for monomer (A) from the viewpoint of satisfactory copolymerizability during emulsion polymerization with the monomer (P). They may also be used alone or as combinations of two or more types.

In order to improve the quality and physical properties, the copolymer may also have another monomer (B) as a monomer unit, in addition to the monomer (P) and monomer (A). The other monomer (B) is a monomer that is different from monomers (A) and (P), and that is copolymerizable with monomer (P). The other monomer (B) is not particularly restricted, and examples include ethylenic unsaturated monomers with a carboxyl group (b1), ethylenic unsaturated monomers with an amide group (b2), ethylenic unsaturated monomers with a hydroxyl group (b3), crosslinkable monomers (b4), (meth)acrylic acid ester monomers (b5), ethylenic unsaturated monomers with a cyano group, ethylenic unsaturated monomers with an aromatic group, and other ethylenic unsaturated monomers. The other monomer (B) may be a single type or a combination of two or more types.

The other monomer (B) may also simultaneously belong to two or more of the aforementioned monomer categories. That is, the other monomer (B) may be an ethylenic unsaturated monomer having two or more groups selected from the group consisting of carboxyl, amide, hydroxyl, cyano and aromatic groups, or it may be a crosslinkable monomer having two or more groups selected from the group consisting of carboxyl, amide, hydroxyl, cyano and aromatic groups, together with an ethylenic unsaturated bond.

Of these, the other monomer (B) is preferably one comprising an ethylenic unsaturated monomer with a carboxyl group (b1), from the viewpoint of improving bindability with the filler or electrode active material. Examples for the ethylenic unsaturated monomer with a carboxyl group (b1) include monocarboxylic acid monomers such as acrylic acid, methacrylic acid and half esters of itaconic acid, half esters of maleic acid and half esters of fumaric acid, and dicarboxylic acid monomers such as itaconic acid, fumaric acid and maleic acid. They may also be used alone or as combinations of two or more types. From the same viewpoint as mentioned above, acrylic acid, methacrylic acid and itaconic acid are preferred, with acrylic acid and methacrylic acid being more preferred.

Likewise, from the viewpoint of improving bindability with the filler or electrode active material, the other monomer (B) is preferably one comprising an ethylenic unsaturated monomer with an amide group (b2). There are no particular restrictions on the ethylenic unsaturated monomer with an amide group (b2), and examples include acrylamide, methacrylamide, N,N-methylenebisacrylamide, diacetoneacrylamide, diacetonemethacrylamide, maleic acid amide and maleimide. They may also be used alone or as combinations of two or more types. Acrylamide and methacrylamide are preferred among those mentioned above. Using acrylamide and/or methacrylamide will tend to increase the bindability of the base material and coating layer.

Likewise, from the viewpoint of improving bindability with the filler or electrode active material, the other monomer (B) is preferably one comprising an ethylenic unsaturated monomer with a hydroxyl group (b3). Examples for the ethylenic unsaturated monomer with a hydroxyl group (b3) include (meth)acrylates with hydroxyl groups, such as hydroxyethyl acrylate, hydroxyethyl methacrylate, hydroxypropyl acrylate and hydroxypropyl methacrylate. They may also be used alone or as combinations of two or more types. Preferred among these are hydroxyethyl acrylate and hydroxyethyl methacrylate. Using hydroxyethyl acrylate and/or hydroxyethyl methacrylate will tend to increase the bindability with the filler or electrode active material.

From the viewpoint of limiting the insoluble portion in the electrolyte solution to a suitable level, the other monomer (B) preferably comprises a crosslinkable monomer (b4). There are no particular restrictions on the crosslinkable monomer (b4), and examples include monomers with two or more radical-polymerizing double bonds, and monomers with a functional group that provides a self-crosslinking structure either during or after polymerization. They may also be used alone or as combinations of two or more types.

Examples of monomers with two or more radical-polymerizing double bonds include divinylbenzene and polyfunctional (meth)acrylates. Preferred among these are polyfunctional (meth)acrylates, from the viewpoint of allowing more satisfactory electrolyte solution resistance to be exhibited even in small amounts.

Polyfunctional (meth)acrylates may be bifunctional (meth)acrylates, trifunctional (meth)acrylates or tetrafunctional (meth)acrylates, examples of which include neopentyl glycol diacrylate, neopentyl glycol dimethacrylate, butanediol diacrylate, butanediol dimethacrylate, trimethylolpropane triacrylate, trimethylolpropane trimethacrylate and pentaerythritol tetraacrylate and pentaerythritol tetramethacrylate. They may also be used alone or as combinations of two or more types. Trimethylolpropane triacrylate and trimethylolpropane trimethacrylate are preferred from the same viewpoint mentioned above.

Examples of monomers with functional groups that provide self-crosslinking structures either during or after polymerization include ethylenic unsaturated monomers with epoxy groups, ethylenic monomers with methylol groups, ethylenic unsaturated monomers with alkoxymethyl groups and ethylenic unsaturated monomers with hydrolyzable silyl groups. They may also be used alone or as combinations of two or more types.

Examples of ethylenic unsaturated monomers with epoxy groups include glycidyl acrylate, glycidyl methacrylate, allyl glycidyl ether, methylglycidyl acrylate and methylglycidyl methacrylate. They may also be used alone or as combinations of two or more types. Glycidyl methacrylate is preferred among those mentioned above.

Examples of ethylenic unsaturated monomers with methylol groups include N-methylolacrylamide, N-methylolmethacrylamide, dimethylolacrylamide and dimethylolmethacrylamide. They may also be used alone or as combinations of two or more types.

Examples of ethylenic unsaturated monomers with alkoxymethyl groups include N-methoxymethylacrylamide, N-methoxymethylmethacrylamide, N-butoxymethylacrylamide and N-butoxymethylmethacrylamide. They may also be used alone or as combinations of two or more types.

Examples of ethylenic unsaturated monomers with hydrolyzable silyl groups include vinylsilane, γ-acryloxypropyltrimethoxysilane, γ-acryloxypropyltriethoxysilane, γ-methacryloxypropyltrimethoxysilane and γ-methacryloxypropyltriethoxysilane. They may also be used alone or as combinations of two or more types.

Polyfunctional (meth)acrylates are particularly preferred for the crosslinkable monomer (b4), because they have low variation in crosslinking degree.

From the viewpoint of satisfactory oxidation resistance of the thermoplastic polymer comprising the copolymer, the other monomer (B) preferably comprises a (meth)acrylic acid ester monomer (b5). The (meth)acrylic acid ester monomer (b5) is a monomer different from the aforementioned monomers (b1) to (b4). Examples for the (meth)acrylic acid ester monomer (b5) include (meth)acrylic acid esters with one ethylenic unsaturated bond, and more specifically (meth)acrylates with alkyl groups, such as methyl acrylate, ethyl acrylate, propyl acrylate, isopropyl acrylate, butyl acrylate, isobutyl acrylate, t-butyl acrylate, n-hexyl acrylate, 2-ethylhexyl acrylate, lauryl acrylate, methyl methacrylate, ethyl methacrylate, propyl methacrylate, isopropyl acrylate, butyl methacrylate, isobutyl methacrylate, t-butyl methacrylate, n-hexyl methacrylate, 2-ethylhexyl methacrylate and lauryl methacrylate (more preferably (meth)acrylates comprising both an alkyl group and a (meth)acryloyloxy group), and (meth)acrylates having an aromatic ring, such as benzyl acrylate, phenyl acrylate, benzyl methacrylate or phenyl methacrylate (more preferably (meth)acrylates comprising an aromatic ring and a (meth)acryloyloxy group). Preferred among these, from the viewpoint of increasing the copolymerizability during emulsion polymerization, are (meth)acrylic acid ester monomers comprising an alkyl group of 4 or more carbon atoms and a (meth)acryloyloxy group, and more preferred are (meth)acrylic acid ester monomers comprising an alkyl group of 6 or more carbon atoms and a (meth)acryloyloxy group. More specifically, methyl methacrylate, butyl acrylate, butyl methacrylate and 2-ethylhexyl acrylate are preferred, butyl acrylate, butyl methacrylate and 2-ethylhexyl acrylate are more preferred, and 2-ethylhexyl acrylate is even more preferred. These (meth)acrylic acid ester monomers (b5) may be used alone, or two or more may be used in combination.

Examples of ethylenic unsaturated monomers with cyano groups include acrylonitrile and methacrylonitrile. Examples of ethylenic unsaturated monomers with aromatic groups include styrene, vinyltoluene and α-methylstyrene. Styrene is preferred among these.

Ethylenic unsaturated monomers having 3 or more repeating units (n) of polyalkyleneglycol groups are generally not considered suitable for emulsion polymerization, but according to this embodiment, a (meth)acrylate monomer with a cycloalkyl group is actively used as a monomer without a polyalkyleneglycol group, together with the ethylenic unsaturated monomer having a number of repeating units (n) of polyalkyleneglycol groups of 3 or greater, to allow the obtained copolymer to be easily dispersed in a dispersing medium such as water.

Compounds represented by the following formula:

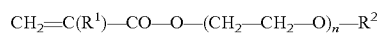

$CH_2=C(R^1)-CO-O-(CH_2-CH_2-O)_n-R^2$

{wherein $R^1$ and $R^2$ each independently represent hydrogen or a methyl group, and n is a number satisfying the inequality $3>n>1$}
are examples of (meth)acrylate monomers wherein the number of repeating units (n) of polyalkyleneglycol groups exceeds 1 and is less than 3.

From the viewpoint of both ion permeability of the separator and adhesion between the inorganic fillers in the filler porous layer, and also ion permeability of the electrode and adhesion between the active material particles, and further from the viewpoint of increasing the bindability between the polyolefin base material and inorganic coating layer and bindability between the collector and active material layer, the total content ratio of the (meth)acrylic acid ester monomer is preferably 50 to 99.9 weight %, more preferably 60 to 99.9 weight %, even more preferably 70 to 99.9 weight % and yet more preferably 80 to 99.9 weight %, based on the weight of the PEU-containing thermoplastic copolymer. At this stage, the (meth)acrylic acid ester monomer includes ethylenic unsaturated monomers having polyalkyleneglycol groups (P) corresponding to (meth)acrylic acid ester monomers, ethylenic unsaturated monomers with cycloalkyl groups (A) corresponding to (meth)acrylic acid ester monomers, and all (meth)acrylic acid ester monomers (b5). If the content ratio of the (meth)acrylic acid ester monomer is within the range specified above, performance will be exhibited from both viewpoints described above, and the oxidation resistance of the thermoplastic polymer will also be more satisfactory, when the separator or electrode is used in a non-aqueous electrolyte solution-employing secondary battery.

According to one embodiment, the binder for an electricity storage device preferably comprises the ethylenic unsaturated monomer with a cycloalkyl group (A) and the (meth)acrylic acid ester monomer (b5) as monomers without a polyalkyleneglycol group, the total content ratio of the ethylenic unsaturated monomer with a cycloalkyl group (A) and the (meth)acrylic acid ester monomer (b5) being preferably 50 to 98 weight % with respect to 100 weight % of the copolymer. Preferred for the (meth)acrylic acid ester monomer (b5) are (meth)acrylic acid ester monomers comprising an alkyl group of 4 or more carbon atoms and a (meth)acryloyloxy group, and more preferred are (meth)acrylic acid ester monomers comprising an alkyl group of 6 or more carbon atoms and a (meth)acryloyloxy group.

When the other monomer (B) comprises an ethylenic unsaturated monomer with a carboxyl group (b1), the content ratio of (b1) in the copolymer is preferably 0.1 to 10 weight %, more preferably 0.1 to 5 weight % and even more preferably 0.1 to 3 weight %, with respect to 100 weight % of the copolymer. If the total content ratio of these three monomers is 0.1 weight % or greater, bindability between the fillers will tend to be increased, and if it is no greater than 5 weight %, the dispersion stability of the aqueous dispersion will tend to be greater.

When the other monomer (B) comprises an ethylenic unsaturated monomer with a carboxyl group (b1), an ethylenic unsaturated monomer with an amide group (b2) or an ethylenic unsaturated monomer with a hydroxyl group (b3), the total content ratio of (b1), (b2) and (b3) in the copolymer is preferably 0.1 to 10 weight % or greater with respect to 100 weight % of the copolymer. If the total content ratio of these three monomers is 0.1 weight % or greater, bindability between the fillers will tend to be increased, and if it is no greater than 10 weight %, removal of water from the aqueous dispersion will tend to be easier.

When the other monomer (B) comprises a crosslinkable monomer (b4), the content ratio of the crosslinkable monomer (b4) in the copolymer is preferably 0.01 to 10 weight %, more preferably 0.1 to 5 weight % and even more preferably 0.1 to 3 weight %, with respect to 100 weight % of the copolymer. If the content ratio of the crosslinkable monomer (b4) is 0.01 weight % or greater the electrolyte solution resistance will be even further increased, and if it is 5 weight % or lower, reduction in bindability between the fillers can be minimized.

The glass transition temperature (hereunder also abbreviated as "Tg") of the binder for an electricity storage device of the invention is preferably −50° C. or higher and more preferably −40 to 10° C. If the glass transition temperature of the binder for an electricity storage device of the invention is within this range, the heat resistance of the separator comprising the filler layer and the strength of the electrode active material layer will tend to be further increased.

The glass transition temperature is determined from a DSC curve obtained by differential scanning calorimetry (DSC). Specifically, it is determined by the intersection between a straight line extending the low-temperature end baseline in the DSC curve toward the high-temperature end, and the tangent line at the inflection point in the stepwise change region of glass transition.

Moreover, "glass transition" refers to a change in heat quantity accompanying the change of state of a polymer test piece in DSC occurring at the endothermic end. The change in heat quantity is observed in the form of a stepwise change in the DSC curve. A "stepwise change" is a portion of the DSC curve moving away from the previous low-temperature end baseline and toward a new high-temperature end baseline. A combination of a stepwise change and a peak is also included in the concept of "stepwise change".

The "inflection point" is the point at which the slope of the DSC curve is maximum in the stepwise change region. If the exothermic end in the stepwise change region is defined as the top end, then this represents the point where the upwardly convex curve changes to a downwardly convex curve. The term "peak" refers to a portion of the DSC curve that moves away from the low-temperature end baseline and then returns to the same baseline. The term "baseline" refers to the DSC curve in the temperature zone where no transition or reaction takes place in the test piece.

The glass transition temperature Tg of the thermoplastic polymer of this embodiment can be appropriately adjusted by changing the monomer components used for production of the thermoplastic polymer, and the loading proportion of each monomer, for example. Specifically, the glass transition temperature for each monomer used for production of the thermoplastic polymer can be estimated from the commonly used Tg for its homopolymer (as listed in "Polymer Handbook (a Wiley-Interscience Publication), for example), and the mixing proportion of the monomer. For example, the Tg of a copolymer copolymerized with a high proportion of a monomer such as methyl methacrylate, acrylonitrile or methacrylic acid, that have homopolymer Tg values of ~100° C., will be higher, and the Tg of a copolymer copolymerized with a high proportion of a monomer such as n-butyl acrylate or 2-ethylhexyl acrylate, that have homopolymer Tg values of ~−50° C., will be lower.

The Tg of a copolymer can also be calculated by the Fox formula, represented as mathematical formula (1):

$$1/Tg = W1/Tg1 + W2/Tg2 + \ldots + Wi/Tgi + \ldots Wn/Tgn \qquad (1)$$

{wherein Tg (K) is the Tg of the copolymer, Tgi (K) is the Tg of a homopolymer of monomer i, and Wi is the weight fraction of each monomer}. However, the glass transition temperature (Tg) of the thermoplastic polymer used for this embodiment is the value measured by a method using DSC as described above.

The mean particle size of the particulate PEU-containing thermoplastic copolymer particles is preferably 30 nm or greater and more preferably 100 nm or greater. The mean particle size of the particulate PEU-containing thermoplastic copolymer particles is also preferably no greater than 1000 nm, more preferably no greater than 800 nm and even more preferably no greater than 700 nm. If the mean particle size of the particulate PEU-containing thermoplastic copolymer particles is 30 nm or greater, the ion permeability will be less likely to be reduced and an electricity storage device with a high output characteristic can be easily obtained. Moreover, an electricity storage device having a smooth shutdown property and a high degree of safety can be obtained more easily even with rapid temperature increase that occurs during abnormal heat release. The mean particle size of the particulate PEU-containing thermoplastic copolymer particles is preferably 800 nm or smaller from the viewpoint of ensuring dispersion stability of the aqueous dispersion, as well as exhibiting satisfactory bindability and heat shrinkage when formed into a multilayer porous film, or in other words, satisfactory battery safety. This will not only allow flexible control of the coating layer thickness, but will also help reduce shedding of the electrode active material during winding, when it is used as an electrode binder. The mean particle size of the copolymer particles can be measured by the method described in the examples below.

The binder for an electricity storage device of the invention may also have a thermoplastic polymer other than the copolymer with an ethylenic unsaturated monomer having a polyalkyleneglycol group with an average number of repeating units (n) of 3 or greater as a monomer unit (PEU-containing thermoplastic copolymer), blended with the PEU-containing thermoplastic copolymer.

The thermoplastic polymer other than the PEU-containing thermoplastic copolymer is not particularly restricted, but it is preferred to use a polymer that is insoluble in the electrolyte solution of the lithium-ion secondary battery and electrochemically stable in the operating range of the lithium-ion secondary battery.

Specific examples of such thermoplastic polymers other than the PEU-containing thermoplastic copolymer include polyolefins such as polyethylene and polypropylene; fluorinated resins such as polyvinylidene fluoride and polytetrafluoroethylene; fluorinated rubbers such as vinylidene fluoride-hexafluoropropylene-tetrafluoroethylene copolymer and ethylene-tetrafluoroethylene copolymer; rubbers such as styrene-butadiene copolymer and its hydrogenated forms, acrylonitrile-butadiene copolymer and its hydrogenated forms, acrylonitrile-butadiene-styrene copolymer and its hydrogenated forms, methacrylic acid ester-acrylic acid ester copolymer, styrene-acrylic acid ester copolymer, acrylonitrile-acrylic acid ester copolymer, ethylene-propylene rubber, polyvinyl alcohol and polyvinyl acetate; cellulose derivatives such as ethyl cellulose, methyl cellulose, hydroxyethyl cellulose and carboxymethyl cellulose; and polyphenylene ether, polysulfone, polyethersulfone, polyphenylene sulfide, polyetherimide, polyamideimide, polyamide, polyester and the like.

From the viewpoint of wettability on the polyolefin microporous film, bindability between the polyolefin microporous film and the binder for an electricity storage device, and adhesion with electrodes, the binder for an electricity storage device is more preferably blended with a polymer having a glass transition temperature below 20° C., and from the viewpoint of blocking resistance and ion permeability, it is more preferably also blended with a polymer having a glass transition temperature of 20° C. or higher.

The thermoplastic polymer may have at least two glass transition temperatures. A thermoplastic polymer with at least two glass transition temperatures can be obtained by a method of blending two or more thermoplastic polymers or a method using a thermoplastic polymer with a core-shell structure, without any limitation to these methods. A "core-shell structure" is a polymer having a double structure form, made of a composition in which the polymer belonging to the core portion and the polymer belonging to the shell portion are different.

For a polymer blend or core-shell structure, the glass transition temperature of the thermoplastic polymer as a whole can be controlled by combination of a polymer with a high glass transition temperature and a polymer with a low glass transition temperature. Multiple functions can also be imparted to the thermoplastic polymer as a whole.

<Method for Producing Binder for Electricity Storage Device>
[Method for Producing Copolymer (PEU-Containing Thermoplastic Copolymer)]

The PEU-containing thermoplastic copolymer as described above can be produced according to a known polymerization method, except for the use of the corresponding monomers or comonomers. The polymerization method used may be any appropriate method such as solution polymerization, emulsion polymerization or bulk polymerization.

An emulsion polymerization method is preferred for obtaining a particulate dispersion. There are no particular restrictions on the method of emulsion polymerization, and any publicly known method of the prior art may be employed. For example, a copolymer can be obtained by polymerizing a monomer composition containing each of the monomers in a dispersed system containing the monomers, a surfactant, a radical polymerization initiator and other additive components as necessary, as the basic components, in an aqueous medium. Various methods may be utilized as necessary for the polymerization, such as a method in which the makeup of the supplied monomer composition is kept constant during the entire polymerization process, or a method in which it is successively or continuously varied during the polymerization process to create morphological variation in the particles of the resin dispersion that is produced. When the copolymer is obtained by emulsion polymerization, it may be in the form of an aqueous dispersion (latex) comprising water and a particulate copolymer dispersed in the water, for example.

A surfactant is a compound having at least one hydrophilic group and at least one lipophilic group in the molecule. Examples of surfactants include anionic surfactants such as non-reactive alkylsulfuric acid esters, polyoxyethylene alkyl ether sulfates, alkylbenzene sulfonates, alkylnaphthalene sulfonates, alkyl sulfosuccinates, alkyldiphenylether disulfonates, naphthalene sulfonic acid formalin condensates, polyoxyethylene polycyclic phenyl ether sulfates, polyoxyethylene distyrenated phenyl ether sulfates, fatty acid salts, alkylphosphoric acid salts and polyoxyethylenealkylphenyl ether sulfuric acid ester salts, and nonionic surfactants such as non-reactive polyoxyethylenealkyl ethers, polyoxyalkylene alkyl ethers, polyoxyethylene polycyclic phenyl ethers, polyoxyethylene distyrenated phenyl ethers, sorbitan fatty acid esters, polyoxyethylenesorbitan fatty acid esters, polyoxyethylene sorbitol fatty acid esters, glycerin fatty acid esters, polyoxyethylene fatty acid esters, polyoxyethylenealkylamines, alkylalkanolamides and polyoxyethylene alkylphenyl ethers. In addition to these, there may be used reactive surfactants comprising an ethylenic double bond introduced into the chemical structural formula of a surfactant having a hydrophilic group and a lipophilic group.

Examples of anionic surfactants among reactive surfactants include ethylenic unsaturated monomers having sulfonic acid, sulfonates or sulfuric acid esters or their salts, among which compounds with groups that are ammonium salts or alkali metal salts of sulfonic acid (ammonium sulfonate or alkali metal sulfonate groups) are preferred. Specific examples include alkylallylsulfosuccinic acid salts (for example, ELEMINOL™ JS-20 by Sanyo Chemical Industries, Ltd. and LATEMUL (trademark, same hereunder) S-120, S-180A and S-180 by Kao Corp., polyoxyethylenealkylpropenylphenyl ethersulfuric acid ester salts (for example, AQUALON (trademark, same hereunder) HS-10 by Dai-ichi Kogyo Seiyaku Co., Ltd.), α-[1-[(allyloxy)methyl]-2-(nonylphenoxy)ethyl]-ω-polyoxyethylenesulfuric acid ester salts (for example, ADEKA REASOAP (trademark, same hereunder) SE-10N by Adeka Corp., ammonium=α-sulfonato-ω-1-(allyloxymethyl)alkyloxy-polyoxyethylene (for example, AQUALON KH-10 by Dai-ichi Kogyo Seiyaku Co., Ltd.), styrenesulfonic acid salts (for example, SPINOMAR™ NaSS by Tosoh Finechem Corp.), α-[2-[(allyloxy)-1-(alkyloxymethyl)ethyl]-ω-polyoxyethylenesulfuric acid ester salts (for example, ADEKA REASOAP SR-10 by Adeka Corp.), and polyoxyethylenepolyoxybutylene (3-methyl-3-butenyl)ether sulfuric acid ester salts (for example, LATEMUL PD-104 by Kao Corp.).

Examples of nonionic surfactants among reactive surfactants also include α-[1-[(allyloxy)methyl]-2-(nonylphenoxy)ethyl]-ω-hydroxypolyoxyethylene (for example, ADEKA REASOAP NE-20, NE-30 and NE-40 by Adeka Corp.), polyoxyethylenealkylpropenylphenyl ethers (for example, AQUALON RN-10, RN-20, RN-30 and RN-50 by Dai-ichi Kogyo Seiyaku Co., Ltd.), α-[2-[(allyloxy)-1-(alkyloxymethyl)ethyl]-ω-hydroxypolyoxyethylene (for example, ADEKA REASOAP ER-10 by Adeka Corp.), and polyoxyethylenepolyoxybutylene (3-methyl-3-butenyl) ether (for example, LATEMUL PD-420 by Kao Corp.).

Among these various types of surfactants, reactive surfactants are preferred, anionic reactive surfactants are more preferred, and reactive surfactants with sulfonic acid groups are even more preferred. These surfactants are preferably used at 0.1 to 5 parts by weight with respect to 100 parts by weight of the monomer composition. One type of surfactant may be used alone, or two or more may be used in combination.

As radical polymerization initiators there may be used any inorganic initiators or organic initiators that undergo radical decomposition by heat or reducing substances to initiate addition polymerization of monomers. Either water-soluble or oil-soluble polymerization initiators may be used as radical polymerization initiators. Examples of water-soluble polymerization initiators include peroxodisulfuric acid salts, peroxides, water-soluble azobis compounds, and peroxide-reducing agent redox-type initiators. Examples of peroxodisulfuric acid salts include potassium peroxodisulfate (KPS), sodium peroxodisulfate (NPS) and ammonium peroxodisulfate (APS), examples of peroxides include hydrogen peroxide, t-butyl hydroperoxide, t-butylperoxymaleic acid and succinic acid peroxide and benzoyl peroxide, examples of water-soluble azobis compounds include 2,2-azobis(N-hydroxyethylisobutylamide), 2,2-azobis(2-amidinopropane) 2HCl and 4,4-azobis(4-cyanopentanoic acid), and examples of peroxide-reducing agent redox-type initiators include combinations of the aforementioned peroxides with one or more reducing agents such as sodium sulfooxylate formaldehyde, sodium hydrogen sulfite, sodium thiosulfate, sodium hydroxymethanesulfinate or L-ascorbic acid, or their salts, cuprous salts or ferrous salts.

The radical polymerization initiator may be used at, preferably, 0.05 to 2 parts by weight with respect to 100 parts by weight of the monomer composition. A single type of radical polymerization initiator may be used, or two or more may be used in combination.

When the monomer composition comprising the ethylenic unsaturated monomer having a polyalkyleneglycol group (P), the ethylenic unsaturated monomer with a cycloalkyl group (A) and the other monomer (B) is to be used for emulsion polymerization and a dispersion is to be formed by dispersing the polymer particles in a solvent (water), the solid content of the dispersion is preferably 30 weight % to 70 weight %.

The dispersion is also preferably adjusted to a pH in the range of 5 to 12 in order to maintain long-term dispersion stability. The pH is preferably adjusted using ammonia, sodium hydroxide, potassium hydroxide or an amine compound such as dimethylaminoethanol, and more preferably the pH is adjusted with ammonia (water) or sodium hydroxide.

The aqueous dispersion of this embodiment comprises particles of a copolymer, obtained by copolymerization of a monomer composition including the specific monomers mentioned above (copolymer particles), dispersed in water. In addition to water and the copolymer, the aqueous dispersion may also include a solvent such as methanol, ethanol or isopropyl alcohol, and a dispersing agent, lubricant, thickener, microbicide or the like.

The binder composition for an electricity storage device of the invention preferably comprises water and a copolymer according to this embodiment, and more preferably it is an aqueous dispersion comprising water and a copolymer according to this embodiment. According to one embodiment, an aqueous dispersion of a particulate PEU-containing thermoplastic polymer may be formed by emulsion polymerization, and the obtained emulsion (aqueous dispersion) of the obtained particulate PEU-containing thermoplastic copolymer may be coated as an aqueous latex. This is preferred as it allows easy formation of a layer comprising the binder for an electricity storage device of the invention.

<Separator for an Electricity Storage Device>

The binder for an electricity storage device of the invention can be used as a separator for an electricity storage device. The separator for an electricity storage device may comprise a porous base material, and a thermoplastic polymer layer disposed on at least a portion of at least one side of the porous base material. The thermoplastic polymer layer preferably comprises a PEU-containing thermoplastic polymer according to the invention. The separator for an electricity storage device may consist entirely of the porous base material and the thermoplastic polymer layer, or it may further comprise a filler porous layer. The filler porous layer preferably comprises the binder for an electricity storage device of the invention as a resin binder.

When the separator for an electricity storage device has a filler porous layer, the filler porous layer is disposed on one or both sides of the polyolefin porous base material. When a filler porous layer and a thermoplastic polymer layer are disposed on the polyolefin porous base material, their mutual positional relationship may be as desired, but from the viewpoint of both the rate characteristic and safety of the electricity storage device, the thermoplastic polymer layer may be disposed so as to expose at least a portion of the filler porous layer, and it is preferably disposed over the filler porous layer.

The members forming the separator for an electricity storage device, and preferred embodiments of the method for producing the separator for an electricity storage device, will now be explained in detail.

[Porous Base Material]

The porous base material may be any one that has been used as a separator in the prior art. The base material is preferably a porous film that has fine pore diameters, and that is ion-conductive without electrical conductivity, and has high resistance to organic solvents. Examples of such porous films include microporous films composed mainly of polyolefin-based resins (for example, polyethylene, polypropylene, polybutene and polyvinyl chloride) or mixtures or copolymers thereof, microporous films composed mainly of resins such as polyethylene terephthalate, polycycloolefin, polyethersulfone, polyamide, polyimide, polyimideamide, polyaramid, polycycloolefin, nylon and polytetrafluoroethylene, and woven polyolefin-based fibers (woven fabrics), nonwoven fabrics of polyolefin-based fibers, and aggregates of insulating material particles. Preferred among these are polyolefin microporous films composed mainly of polyolefin-based resins, from the viewpoint of excellent coatability of the coating solution when the polymer layer is to be obtained by a coating process, allowing the separator thickness to be further reduced, and of increasing the proportion of active material in the electricity storage device such as a battery, to increase the capacity per volume. The phrase "composed mainly of" as used herein means that it contains the component in an amount exceeding 50 weight %, preferably 75 weight % or greater, more preferably 85 weight % or greater, even more preferably 90 weight % or greater, yet more preferably 95 weight % or greater and most preferably 98 weight % or greater, with 100 weight % also being acceptable.

The polyolefin resin is not particularly restricted and may be a polyolefin resin commonly used in extrusion, ejection, inflation or blow molding, and homopolymers, copolymers and multistage polymers of ethylene, propylene, 1-butene, 4-methyl-1-pentene, 1-hexene and 1-octene may be used. Polyolefins selected from the group consisting of these homopolymers and copolymers or multistage polymers may be used alone, or they may be used in admixture.

Typical examples of polyolefin resins include, but are not restricted to, low-density polyethylene, linear low-density polyethylene, medium-density polyethylene, high-density polyethylene, ultrahigh molecular weight polyethylene, isotactic polypropylene, atactic polypropylene, ethylene-propylene random copolymer, polybutene, ethylene-propylene rubber and the like.

The material of the polyolefin porous base material to be used as the separator for an electricity storage device is most preferably a resin composed mainly of high-density polyethylene, for its low melting point and high strength. Two or more different types of these polyethylenes may also be used in combination to impart flexibility. The polymerization catalyst used for production of the polyethylene is not particularly restricted, and examples include Ziegler-Natta catalysts, Phillips catalysts and metallocene-based catalysts.

For improved heat resistance of the polyolefin porous base material, it is more preferred to use a porous film composed of a resin composition comprising polypropylene and a polyolefin resin other than polypropylene.

The spatial structure of polypropylene is not restricted, and it may be isotactic polypropylene, syndiotactic polypropylene or atactic polypropylene.

There is no particular restriction on the proportion of polypropylene with respect to the total polyolefins in the polyolefin resin composition, but from the viewpoint of both heat resistance and a satisfactory shutdown function, it is preferably 1 to 35 weight %, more preferably 3 to 20 weight % and even more preferably 4 to 10 weight %.

The polymerization catalyst is also not particularly restricted, and a Ziegler-Natta catalyst or metallocene-based catalyst, for example, may be used.

The polyolefin resin other than polypropylene is not restricted and may be a homopolymer or copolymer of an olefin hydrocarbon such as ethylene, 1-butene, 4-methyl-1-pentene, 1-hexene or 1-octene olefin, for example. Specifically, the polyolefin resin other than polypropylene may be polyethylene, polybutene or ethylene-propylene random copolymer.

From the viewpoint of the shutdown property, which represents the degree to which the pores of the polyolefin porous base material become occluded by heat-fusion, the polyolefin resin other than polypropylene is preferably polyethylene, such as low-density polyethylene, linear low-density polyethylene, medium-density polyethylene, high-density polyethylene or ultrahigh molecular weight polyethylene. Polyethylene with a density of 0.93 g/cm$^3$ or greater as measured according to JIS K 7112 is preferred among these from the viewpoint of strength.

The viscosity-average molecular weight of the polyolefin resin composing the polyolefin porous base material is not particularly restricted, but is preferably 30,000 or greater and no greater than 12,000,000, more preferably 50,000 or greater and less than 2,000,000, and even more preferably 100,000 or greater and less than 1,000,000. If the viscosity-average molecular weight is 30,000 or greater, the melt tension during melt molding will be increased, resulting in satisfactory moldability, while the strength will also tend to be high due to entanglement between the polymers. If the viscosity-average molecular weight is 12,000,000 or lower, on the other hand, it will be easier to accomplish uniform melt kneading, and the sheet moldability, and especially its thickness stability, will tend to be superior. The viscosity-average molecular weight is also preferably lower than 1,000,000 because the pores will be easily occluded during temperature increase, and a satisfactory shutdown function will tend to be obtained.

For example, instead of using only a polyolefin with a viscosity-average molecular weight of lower than 1,000,000, a mixture of a polyolefin with a viscosity-average molecular weight of 2,000,000 and a polyolefin with a viscosity-average molecular weight of 270,000 may be used, in such a proportion that the viscosity-average molecular weight of the mixture is lower than 1,000,000.

The polyolefin porous base material of this embodiment may also contain optional additives. Such additives are not particularly restricted and examples include polymers other than polyolefins; inorganic particles; phenol-based, phosphorus-based and sulfur-based antioxidants; metal soaps such as calcium stearate and zinc stearate; ultraviolet absorbers; light stabilizers; antistatic agents; anti-fogging agents; and color pigments.

The total content of additives is no greater than 20 parts by weight, more preferably no greater than 10 parts by weight and even more preferably no greater than 5 parts by weight, with respect to 100 parts by weight of the polyolefin resin composition.

The viscosity-average molecular weight (Mv) is calculated based on ASTM-D4020 from the following formula, using decalin as the solvent, the limiting viscosity [l] being measured at 135° C.

Polyethylene: $[\eta]=6.77\times10^{-4}M_v^{0.67}$

Polypropylene: $[\eta]=1.10\times10^{-4}M_v^{0.80}$ (Chiang formula)

The porosity of the polyolefin porous base material is not particularly restricted but is preferably 20% or greater and more preferably 35% or greater, and preferably no greater than 90% and more preferably no greater than 80%. The porosity is preferably 20% or greater from the viewpoint of ensuring the permeability of the separator. The porosity is also preferably no greater than 90% from the viewpoint of ensuring puncture strength. The porosity can be calculated by the following formula:

Porosity=(volume−weight/film density)/volume×100, based on the volume (cm$^3$), weight (g) and film density (g/cm$^3$) of a measuring sample of the polyolefin porous base material. When the polyolefin porous base material is composed of polyethylene, for example, calculation may be performed assuming a film density of 0.95 (g/cm$^3$). The porosity can be adjusted by changing the draw ratio of the polyolefin porous base material.

The gas permeability of the polyolefin porous base material is not particularly restricted, but is preferably 10 seconds/100 cc or greater and more preferably 50 seconds/100 cc or greater, and preferably no greater than 1,000 seconds/100 cc and more preferably no greater than 500 seconds/100 cc. The gas permeability is preferably 10 seconds/100 cc or greater from the viewpoint of minimizing self-discharge of the electricity storage device. The gas permeability is also preferably no greater than 1,000 seconds/100 cc from the viewpoint of obtaining a satisfactory charge-discharge characteristic. The gas permeability referred to here is the air permeability resistance measured according to JIS P-8117. The gas permeability can be adjusted by changing the stretching temperature and/or draw ratio of the porous base material.

The mean pore size of the polyolefin porous base material is preferably no greater than 0.15 μm and more preferably no greater than 0.1 μm, with a preferred lower limit of 0.01 μm. A mean pore size of no greater than 0.15 μm is preferred from the viewpoint of minimizing self-discharge of the electricity storage device and helping to prevent reduction in capacity. The mean pore size can be adjusted by changing the draw ratio during production of the polyolefin porous base material.

The puncture strength of the polyolefin porous base material is not particularly restricted, but is preferably 200 g/20 μm or greater and more preferably 300 g/20 μm or greater, and preferably no greater than 2,000 g/20 μm and more preferably no greater than 1,000 g/20 μm. The puncture strength is preferably 200 g/20 μm or greater from the viewpoint of minimizing film rupture when the active material is shed during battery winding, and from the viewpoint of concerns of short circuiting by expansion and contraction of the electrodes that occurs with charge-discharge. On the other hand, the puncture strength is preferably no greater than 2,000 g/20 μm from the viewpoint of reducing width contraction caused by relaxation of the orientation during heating. The puncture strength is measured by the method described in the examples below.

The puncture strength can be adjusted by setting the draw ratio and/or stretching temperature of the polyolefin porous base material.

The thickness of the polyolefin porous base material is not particularly restricted, but is preferably 2 μm or greater and more preferably 5 μm or greater, and preferably no greater than 100 μm, more preferably no greater than 60 μm and even more preferably no greater than 50 μm. The thickness is preferably adjusted to 2 μm or greater from the viewpoint of increasing the mechanical strength. The film thickness is also preferably adjusted to no greater than 100 μm because this will reduce the volume of the battery occupied by the separator, which is advantageous for increasing the capacity of the battery.

[Filler Porous Layer]

The filler porous layer comprises an inorganic filler and a resin binder.

(Inorganic Filler)

The inorganic filler used in the filler porous layer is not particularly restricted, but preferably it has a melting point of 200° C. or higher and also high electrical insulating properties, and is also electrochemically stable in the range in which the lithium-ion secondary battery is to be used.

The inorganic filler is not particularly restricted, and examples include oxide-based ceramics such as alumina, silica, titania, zirconia, magnesia, ceria, yttria, zinc oxide and iron oxide; nitride-based ceramics such as silicon nitride, titanium nitride and boron nitride; ceramics such as silicon carbide, calcium carbonate, magnesium sulfate, aluminum sulfate, aluminum hydroxide, aluminum hydroxide oxide, potassium titanate, talc, kaolinite, dickite, nacrite, halloysite, pyrophyllite, montmorillonite, sericite, mica, amesite, bentonite, asbestos, zeolite, calcium silicate, magnesium silicate, diatomaceous earth and quartz sand; and glass fibers. They may be used alone, or more than one type may be used together.

Preferred among those mentioned above, from the viewpoint of improving the electrochemical stability and the heat-resistant properties of the separator, are aluminum silicate compounds without ion-exchange properties, which include aluminum oxide compounds such as alumina and aluminum hydroxide oxide; as well as kaolinite, dickite, nacrite, halloysite and pyrophyllite.

Alumina types include a large number of crystalline forms such as α-alumina, β-alumina, γ-alumina and θ-alumina, any of which are suitable for use. Because α-alumina is thermally and chemically stable, it is preferably used.

Aluminum hydroxide oxide (AlO(OH)) is particularly preferred as an aluminum oxide compound. Boehmite is a more preferred aluminum hydroxide oxide from the viewpoint of preventing internal short circuiting caused by generation of lithium dendrites. If particles composed mainly of boehmite are used as the inorganic filler of the porous layer, it will be possible to obtain an exceedingly lightweight porous layer while maintaining high permeability, and heat shrinkage of the porous film at high temperature will tend to be inhibited and excellent heat resistance exhibited, even with a thin porous layer. Synthetic boehmite is even more preferred because it can reduce ionic impurities that may adversely affect the properties of electrochemical devices.

Kaolin composed mainly of kaolin mineral is more preferred as an aluminum silicate compound without ion-exchange properties, because it is inexpensive and readily available. Wet kaolin, and calcined kaolin obtained by its firing, are known types of kaolin. Calcined kaolin is particularly preferred for this embodiment. Calcined kaolin is especially preferred from the viewpoint of electrochemical stability, because the water of crystallization has already been released during firing, and the impurities have also been removed.

The mean particle size of the inorganic filler is preferably at least 0.01 μm and no greater than 4.0 μm, more preferably at least 0.2 μm and no greater than 3.5 μm, and even more preferably at least 0.4 μm and no greater than 3.0 μm. Adjusting the mean particle size of the inorganic filler to within this range is preferred from the viewpoint of minimizing heat shrinkage at high temperature even when the filler porous layer has a small thickness (for example, 7 μm or smaller). The method of adjusting the particle diameters of the inorganic filler and their distribution may be, for example, a method of pulverizing the inorganic filler using a suitable pulverizing apparatus such as a ball mill, bead mill or jet mill to reduce their particle diameters.

Examples for the form of the inorganic filler include scaly, needle-like, columnar, spherical, polyhedral and globular. Different types of inorganic fillers with such shapes may also be combined.

The proportion of the inorganic filler in the filler porous layer may be determined as appropriate from the standpoint of bindability of the inorganic filler, and permeability and heat resistance of the separator. The proportion of the inorganic filler in the filler porous layer is preferably 20 weight % or greater and less than 100 weight %, more preferably between 50 weight % and 99.99 weight % inclusive, even more preferably between 80 weight % and 99.9 weight % inclusive, and most preferably between 90 weight % and 99 weight %, inclusive.

(Resin Binder)

The resin binder is preferably a resin latex binder (i.e. a resin binder in the form of an "aqueous latex"). When a resin latex binder is used as the resin binder, the separator provided with the filler porous layer comprising the resin binder and inorganic filler is less likely to have reduced ion permeability, compared to a separator wherein the resin binder is bonded to the porous film by a step of coating the resin binder solution onto the base material, and this will tend to provide the electricity storage device with a higher output characteristic. Moreover, even with rapid temperature increase that occurs during abnormal heat release, the electricity storage device with the separator formed using a resin latex binder exhibits a smooth shutdown property, and a high degree of safety can be obtained more easily.

From the viewpoint of lowering the ion resistance of the filler porous layer, it is preferred to include a binder for an electricity storage device of the invention as a resin binder in the filler porous layer.

From the viewpoint of improving the heat resistance and insulating properties, the thickness of the filler porous layer is preferably 0.5 μm or greater, while it is preferably no greater than 50 µm from the viewpoint of increasing the capacity and permeability of the battery.

The density of the filler porous layer is preferably 0.5 g/cm³ to 3.0 g/cm³ and more preferably 0.7 g/cm³ to 2.0 g/cm³. If the layer density of the filler porous layer is at least 0.5 g/cm³ the heat shrinkage factor at high temperature will tend to be satisfactory, and if it is 3.0 g/cm³ or lower the gas permeability will tend to be reduced.

The method of forming the filler porous layer may be by coating at least one side of the base material with a coating solution comprising an inorganic filler and a resin binder. For such a method, the coating solution may include a solvent and a dispersing agent to increase the dispersion stability and coatability.

The method of coating the coating solution onto the base material is not particularly restricted so long as the necessary layer thickness and coating area can be obtained. For example, the filler starting material comprising the resin binder and the polymer base material starting material may be laminated and extruded by a co-extrusion method, or the base material and the filler porous film may be fabricated separately and then attached together.

[Thermoplastic Polymer Layer]

If desired, the separator for an electricity storage device may have a thermoplastic polymer layer in addition to the polyolefin porous base material and the filler porous layer. From the viewpoint of increasing adhesion with the separator and lowering the ion resistance, the thermoplastic polymer layer preferably comprises a PEU-containing thermoplastic polymer according to the invention. The thermoplastic polymer layer may be disposed on one or both sides of the polyolefin porous base material, or on the filler porous layer, and preferably it is disposed in such a manner that at least a portion of the filler porous layer is exposed.

The area ratio of the thermoplastic polymer layer with respect to the total area of the surface of the porous base material on which the thermoplastic polymer layer is disposed, is preferably no greater than 100%, 80%, 75% or 70%, and the same area ratio is preferably at least 5%, 10% or 15%. Limiting the coating area of the thermoplastic polymer layer to no greater than 100% is preferred from the viewpoint of further minimizing occlusion of the pores of the base material by the thermoplastic polymer and further increasing the permeability of the separator. The coating area is also preferably at least 5% from the viewpoint of further increasing adhesion with electrodes. The area ratio is measured by SEM observation of the thermoplastic polymer layer-formed surface of the separator.

When the thermoplastic polymer layer is a layer combined with an inorganic filler, the area in which the thermoplastic polymer is present is calculated using the total area of the thermoplastic polymer and the inorganic filler as 100%.

When the thermoplastic polymer layer is disposed on only a portion of the polyolefin porous base material and inorganic filler layer, the arrangement pattern of the thermoplastic polymer layer may be, for example, dotted, striped, lattice-like, banded, hexagonal, random, or any combination of these.

The thickness of the thermoplastic polymer layer disposed on the polyolefin porous base material is preferably 0.01 µm to 5 µm, more preferably 0.1 µm to 3 µm and even more preferably 0.1 to 1 µm, on each side of the base material.

(Thermoplastic Polymer)

The thermoplastic polymer layer comprises a thermoplastic polymer. The thermoplastic polymer layer includes the thermoplastic polymer at preferably 60 weight % or greater, more preferably 90 weight % or greater, even more preferably 95 weight % or greater and most preferably 98 weight % or greater, with respect to the entire weight. The thermoplastic polymer layer may also include other components in addition to the thermoplastic polymer.

Examples of thermoplastic polymers include the following: polyolefin resins such as polyethylene, polypropylene and α-polyolefin; fluorine-based polymers such as polyvinylidene fluoride and polytetrafluoroethylene, and copolymers comprising them; diene-based polymers comprising conjugated dienes such as butadiene and isoprene as monomer units, or copolymers comprising them, or their hydrogenated forms; acrylic polymers comprising (meth)acrylates as monomer units and having no polyalkylene glycol units, acrylic polymers comprising (meth)acrylates as monomer units and having one or two polyalkylene glycol chains, or copolymers comprising them, or their hydrogenated forms; rubber compounds such as ethylene-propylene rubber, polyvinyl alcohol and polyvinyl acetate; cellulose derivatives such as ethyl cellulose, methyl cellulose, hydroxyethyl cellulose and carboxymethyl cellulose; polyalkylene glycols without polymerizable functional groups, such as polyethylene glycol and polypropylene glycol; resins such as polyphenylene ether, polysulfone, polyethersulfone, polyphenylene sulfide, polyetherimide, polyamideimide, polyamide and polyester; and copolymers having ethylenic unsaturated monomers with numbers of repeating units (n) of polyalkyleneglycol groups of 3 or greater, as monomer units, which were mentioned above as resin binders for forming the filler porous layer and electrode active material layer, as well as combinations of the above.

Preferred among these are diene-based polymers, acrylic polymers and fluorine-based polymers, from the viewpoint of adhesion with electrode active materials, flexibility, and polymer ion permeability.

The glass transition temperature (Tg) of the thermoplastic polymer is preferably −50° C. or higher and more preferably in the range of −50° C. to 150° C., from the viewpoint of adhesion with electrodes and ion permeability.

From the viewpoint of wettability on the polyolefin microporous film, bindability between the polyolefin microporous film and the thermoplastic polymer layer and adhesion with electrodes, the thermoplastic polymer layer is more preferably blended with a polymer having a glass transition temperature below 20° C., and from the viewpoint of blocking resistance and ion permeability, it is more preferably also blended with a polymer having a glass transition temperature of 20° C. or higher.

A thermoplastic polymer with at least two glass transition temperatures can be obtained by a method of blending two or more thermoplastic polymers or a method using a thermoplastic polymer with a core-shell structure, without any limitation to these methods.

A core-shell structure means that the polymer has a double structure form, made of a composition in which the polymer belonging to the core portion and the polymer belonging to the shell portion are different.

For a polymer blend or core-shell structure, the glass transition temperature of the thermoplastic polymer as a whole can be controlled by combination of a polymer with a high glass transition temperature and a polymer with a low glass transition temperature. Multiple functions can also be imparted to the thermoplastic polymer as a whole.

A thermoplastic copolymer is preferably one that is particulate when the glass transition temperature is room temperature (for example, 20° C., 25° C. or 30° C.) or higher, from the viewpoint of blocking resistance and ion permeability of the separator.

By including a particulate thermoplastic copolymer in the thermoplastic polymer layer it is possible to ensure porosity for the thermoplastic polymer layer disposed on the base material, and blocking resistance for the separator.

The mean particle size of the particulate thermoplastic copolymer is preferably 10 nm or greater, more preferably 50 nm or greater, even more preferably 100 nm or greater, particularly preferably 130 nm or greater, especially preferably 150 nm or greater and most preferably 200 nm or greater. It is also preferably no greater than 2,000 nm, more preferably no greater than 1,500 nm, even more preferably no greater than 1,000 nm, yet more preferably no greater than 800 nm, especially preferably no greater than 800 nm and most preferably no greater than 750 nm. A mean particle size of 10 nm or greater is to ensure dimensions for the particulate thermoplastic polymer so that it will not infiltrate into the pores of the base material that includes at least the porous film, when the particulate thermoplastic polymer has been coated onto the base material. This is therefore preferred from the viewpoint of increasing adhesion between the electrode and separator, and improving the cycle characteristics of the electricity storage device. A mean particle size of no greater than 2,000 nm is preferred from the viewpoint of coating the base material with the particulate thermoplastic polymer in an amount necessary to obtain both satisfactory adhesion between the electrode and separator and excellent cycle characteristics for the electricity storage device. The mean particle size of the particulate thermoplastic polymer can be measured by the method described in the Examples.

The particulate thermoplastic polymer described above can be produced by a known polymerization method using the corresponding monomers or comonomers. The polymerization method used may be any appropriate method such as solution polymerization, emulsion polymerization or bulk polymerization.

In order to allow the thermoplastic polymer layer to be easily formed by coating, preferably the particulate thermoplastic polymer is formed by emulsion polymerization and the thermoplastic polymer emulsion obtained by the polymerization is used as an aqueous latex.

(Optional Components)

The thermoplastic polymer layer may comprise the thermoplastic polymer alone, or it may also comprise other optional components in addition to the thermoplastic polymer. Examples of optional components include the inorganic filler described above for formation of the filler porous layer.

<Method for Producing Separator for Electricity Storage Device>

[Method for Producing Porous Base Material]

The method for producing the porous base material is not particularly restricted, and any publicly known production method may be employed. Examples include a method of melt kneading a polyolefin resin composition and a plasticizer and molding the mixture into a sheet, optionally with stretching, and then extracting the plasticizer to form pores; a method of melt kneading a polyolefin resin composition, extruding it at a high draw ratio, and then stretching it with heat treatment to detach the polyolefin crystal interface and form pores; a method of melt kneading a polyolefin resin composition and an inorganic filler and casting the mixture into a sheet, and then detaching the interface between the polyolefin and the inorganic filler by stretching to form pores; and a method of first dissolving the polyolefin resin composition, and then dipping it in a poor solvent for the polyolefin to solidify the polyolefin while simultaneously removing the solvent, to form pores.

The method of fabricating a nonwoven fabric or paper sheet as the base material may also be a publicly known method. The fabrication method may be, for example, a chemical bond method in which a web is immersed in a binder and dried to produce bonding between the fibers; a thermal bond method in which heat-fusible fibers are mixed into a web and the fibers are partially melted to produce bonding between the fibers; a needle punching method in which a web is repeatedly pierced with a puncturing needle to mechanically tangle the fibers; or a hydroentangling method in which a high-pressure water stream is sprayed from a nozzle onto a web through a net (screen), producing tangling between the fibers.

An example of a method of producing the polyolefin porous base material will now be described, as a method of melt kneading a polyolefin resin composition and a plasticizer, casting the mixture into a sheet, and then extracting the plasticizer.

First, the polyolefin resin composition and the plasticizer are melt kneaded. In the melt kneading method, a polyolefin resin and other additives as necessary may be loaded into a resin kneader such as an extruder, kneader, Laboplastomil, kneading roll or Banbury mixer, and the plasticizer introduced at a desired proportion and kneaded in while hot melting the resin components. Before loading the polyolefin resin, the other additives and the plasticizer into the resin kneader, they are preferably pre-kneaded in a prescribed proportion using a Henschel mixer or the like. More preferably, only a portion of the plasticizer is loaded in during the pre-kneading, while the remainder of the plasticizer is kneaded in while side feeding it to the resin kneader.

The plasticizer used may be a non-volatile solvent that can form a homogeneous solution at or above the melting point of the polyolefin. Specific examples of such non-volatile solvents include hydrocarbons such as liquid paraffin and paraffin wax; esters such as dioctyl phthalate and dibutyl phthalate; and higher alcohols such as oleyl alcohol and stearyl alcohol, with liquid paraffin being preferable among these. Liquid paraffin is preferred among these.

The proportion of the polyolefin resin composition and the plasticizer is not particularly restricted so long as it is in a range in which they can undergo uniform melt kneading to then be cast into a sheet form. For example, the weight fraction of the plasticizer in the composition comprising the polyolefin resin composition and the plasticizer is preferably 30 to 80 weight % and more preferably 40 to 70 weight %. The weight fraction of the plasticizer is preferably within this range from the viewpoint of both melt tension during melt molding, and formation of a homogeneous and fine pore structure.

The melt kneaded mixture is then cast into a sheet. The method of producing the cast sheet may be, for example, a method of extruding the melt kneaded mixture through a T-die or the like into a sheet, and contacting it with a heat conductor to cool it to a sufficiently lower temperature than the crystallization temperature of the resin component, thereby solidifying it. The heat conductor used for the cooling solidification may be metal, water, air or the plasticizer itself, but a metal roll is preferred because it has high heat conduction efficiency. When the melt kneaded mixture is to be contacted with metal rolls, it is more preferably sandwiched between the rolls because this will further increase the heat conduction efficiency while causing the sheet to become oriented and increasing the film strength, while the surface smoothness of the sheet will also be improved. The die lip gap when extruding into a sheet from a T-die is preferably from 400 μm to 3,000 μm and more preferably from 500 μm to 2,500 μm.

The cast sheet obtained in this manner is then preferably stretched. Both uniaxial stretching and biaxial stretching are suitable for the stretching treatment. Biaxial stretching is preferred from the viewpoint of the strength of the obtained porous base material. When a cast sheet is subjected to high-ratio stretching in the biaxial directions, the molecules become oriented in the in-plane direction, such that the porous base material that is obtained as the final result is less likely to tear, and has high puncture strength. Examples of stretching methods include simultaneous biaxial stretching, sequential biaxial stretching, multistage stretching and repeated stretching. Simultaneous biaxial stretching is preferred from the viewpoint of increasing the puncture strength and obtaining greater uniformity during stretching and superior shutdown properties.

The draw ratio is an area increase by a factor of preferably in the range of 20 to 100, and more preferably in the range of 25 to 50. The draw ratio in each axial direction is preferably in the range of between 4 and 10, inclusive, in the MD direction and between 4 and 10, inclusive, in the TD direction, and more preferably in the range of between 5 and 8, inclusive, in the MD direction and between 5 and 8, inclusive, in the TD direction. The increase in total area is preferably within this range, because it will be possible to impart sufficient strength while preventing film breakage in the stretching step and obtaining high productivity.

The cast sheet obtained as described above may also be subjected to rolling. Rolling may be carried out, for example, by a press method using a double belt press machine or the like. Rolling can increase the orientation of the surface layer sections, in particular. The area increase by rolling is preferably by a factor of greater than 1 and no greater than 3, and more preferably a factor of greater than 1 and no greater than 2. The area increase by rolling is preferably within this range from the viewpoint of increasing the film strength of the porous base material that is obtained at the final stage, and allowing formation of a porous structure that is uniform in the thickness direction of the film.

The plasticizer is then removed from the cast sheet to obtain a porous base material. The method of removing the plasticizer may be, for example, a method of immersing the cast sheet in an extraction solvent to extract the plasticizer, and then thoroughly drying it. The method of extracting the plasticizer may be either a batch process or a continuous process. In order to minimize contraction of the porous base material, it is preferred to constrain the edges of the cast sheet during the series of steps of immersion and drying. The plasticizer residue in the porous base material is preferably less than 1 weight %.

The extraction solvent used is preferably one that is a poor solvent for the polyolefin resin and a good solvent for the plasticizer, and that has a boiling point that is lower than the melting point of the polyolefin resin. Examples of such extraction solvents include hydrocarbons such as n-hexane and cyclohexane; halogenated hydrocarbons such as methylene chloride and 1,1,1-trichloroethane; non-chlorine-based halogenated solvents such as hydrofluoroethers and hydrofluorocarbons; alcohols such as ethanol and isopropanol; ethers such as diethyl ether and tetrahydrofuran; and ketones such as acetone and methyl ethyl ketone. These extraction solvents may be collected by a process such as distillation and then reutilized.

In order to minimize contraction of the porous base material, heat treatment such as heat setting or thermal relaxation may be carried out, either after the stretching step or after formation of the porous base material. The porous base material may also be subjected to post-treatment such as hydrophilicizing treatment with a surfactant, or crosslinking treatment with ionizing radiation.

Surface treatment is preferably carried out on the surface of the polyolefin porous base material because this will facilitate subsequent coating of the coating solution, while improving adhesion between the polyolefin porous base material and the filler porous layer or thermoplastic polymer layer. The method of surface treatment may be, for example, corona discharge treatment, plasma treatment, mechanical roughening, solvent treatment, acid treatment or ultraviolet oxidation.

[Method of Disposing Filler Porous Layer]

The filler porous layer can be disposed on the base material by, for example, coating at least one side of the base material with a coating solution comprising the inorganic filler, the resin binder and, optionally, additional components such as a solvent (for example, water) and a dispersing agent. An emulsion obtained by synthesis of the resin binder by emulsion polymerization may also be used directly as the coating solution.

The method of coating the coating solution onto the base material is not particularly restricted so long as the necessary layer thickness and coating area can be obtained. Examples for the coating method include gravure coater methods, small-diameter gravure coater methods, reverse roll coater methods, transfer roll coater methods, kiss coater methods, dip coater methods, knife coater methods, air doctor coater methods, blade coater methods, rod coater methods, squeeze coater methods, cast coater methods, die coater methods, screen printing methods, spray coating methods and ink-jet coating methods. Preferred among these are gravure coater methods, because they allow a high degree of freedom for the coating shape.

The filler starting material comprising the resin binder and the polymer base material starting material may also be laminated and extruded by a co-extrusion method, or the base material and the filler porous film may be fabricated separately and then attached together.

The method of removing the solvent from the coated film after coating is not particularly restricted so long as it does not adversely affect the base material or the porous layer. For example, it may be a method of drying at a temperature below the melting point of the base material while the base material is anchored, or a method of reduced pressure drying at low temperature.

[Method of Disposing Thermoplastic Polymer Layer]

The thermoplastic polymer may be disposed on the base material by, for example, coating the base material with a coating solution comprising the thermoplastic polymer. An emulsion (aqueous dispersion) obtained by synthesis of the thermoplastic polymer by emulsion polymerization may also be used directly as the coating solution. The coating solution preferably comprises a poor solvent, such as water or a mixed solvent of water and a water-soluble organic medium (for example, methanol or ethanol).

The method of coating the coating solution containing the thermoplastic polymer onto the polyolefin porous base material is not particularly restricted so long as it can result in the desired coating pattern, coated film thickness and coating area. For example, the coating method described above for coating of the inorganic filler-containing coating solution may be used. A gravure coater method or spray coating method is preferred from the viewpoint of a high degree of freedom for the coating shape of the thermoplastic polymer, and in order to easily obtain the preferred area ratio.

The method of removing the solvent from the coated film after coating is not particularly restricted so long as it is a method that does not adversely affect the porous base material or the polymer layer. For example, it may be a method of drying the polyolefin porous base material at a temperature below its melting point while anchoring it, a method of reduced pressure drying at low temperature, or a method of immersing it in a poor solvent for the thermoplastic polymer to solidify the thermoplastic polymer as particles, while simultaneously extracting out the solvent.

<Physical Properties of Separator for Electricity Storage Device>

The gas permeability of the separator for an electricity storage device is preferably between 10 seconds/100 cc and 650 seconds/100 cc, inclusive, more preferably between 20 seconds/100 cc and 500 seconds/100 cc, inclusive, even more preferably between 30 seconds/100 cc and 450 seconds/100 cc, inclusive, and most preferably between 50 seconds/100 cc and 400 seconds/100 cc, inclusive. The gas permeability is the air permeability resistance measured according to JIS P-8117, similar to the gas permeability of the polyolefin porous base material.

If the gas permeability of the separator is at least 10 seconds/100 cc, self-discharge during use as a battery separator will tend to be reduced, and if it is 650 seconds/100 cc or shorter, a satisfactory charge-discharge characteristic will tend to be obtained.

The separator for an electricity storage device that exhibits such extremely high gas permeability exhibits high ion permeability when it is utilized in a lithium-ion secondary battery.

The final thickness of the separator is preferably between 2 μm and 200 μm, inclusive, more preferably between 5 μm and 100 μm, inclusive and even more preferably between 7 μm and 30 μm, inclusive. If the thickness is at least 2 μm the mechanical strength will tend to be adequate, and if it is no greater than 200 μm, the volume occupied by the separator will be reduced, which tends to be advantageous for the purpose of increasing the capacity of the battery.

<Electricity Storage Device>

An electricity storage device usually has a positive electrode, a separator for an electricity storage device and a negative electrode. The electricity storage device of the invention comprises a binder for an electricity storage device of the invention. The construction other than that of comprising a binder for an electricity storage device of the invention may be the same as an electricity storage device known in the prior art. There are no particular restrictions on the electricity storage device, and examples include batteries such as non-aqueous electrolyte solution secondary batteries, as well as condensers and capacitors. From the viewpoint of more effectively obtaining advantages by the function and effect of the invention, the electricity storage device is preferably a battery, more preferably a non-aqueous electrolyte solution secondary battery, and even more preferably a lithium-ion secondary battery. A preferred mode in which the electricity storage device is a non-aqueous electrolyte solution secondary battery will now be described.

The positive electrode used may be a positive electrode having a positive electrode active material layer comprising a positive electrode active material formed on a positive electrode collector. The positive electrode collector may be an aluminum foil, for example, and the positive electrode active material may be a lithium-containing complex oxide such as $LiCoO_2$, $LiNiO_2$, spinel $LiMnO_4$ or olivine-type $LiFePO_4$, for example. The positive electrode active material layer may include a binder for an electricity storage device of the invention and a conductive material, in addition to the positive electrode active material.

The negative electrode used may be a negative electrode having a negative electrode active material layer comprising a negative electrode active material formed on a negative electrode collector. The negative electrode collector may be a copper foil, for example, and the negative electrode active material may be a carbon material such as graphite, a non-graphitizable carbon material, an easily graphitizable carbon material or complex carbon; or silicon, tin, metal lithium or any of various alloy materials, for example. The negative electrode active material layer may include a binder for an electricity storage device of the invention and a conductive material, in addition to the negative electrode active material.

The separator for an electricity storage device can be used as a separator for an electricity storage device comprising a binder for an electricity storage device of the invention, as described above.

There are no particular restrictions on the non-aqueous electrolyte solution, and an electrolyte solution comprising an electrolyte dissolved in an organic solvent may be used. Examples of organic solvents include propylene carbonate, ethylene carbonate, dimethyl carbonate, diethyl carbonate and ethylmethyl carbonate. Examples of electrolytes include lithium salts such as $LiClO_4$, $LiBF_4$ and $LiPF_6$.

The method of producing the electricity storage device is not particularly restricted. The following methods may be mentioned as examples.

The separator for an electricity storage device can be produced by first fabricating longitudinally shaped separators each with a width of 10 to 500 mm (preferably 80 to 500 mm) and a length of 200 to 4,000 m (preferably 1,000 to 4,000 m), laminating the separators in the order: positive electrode-separator-negative electrode-separator, or negative electrode-separator-positive electrode-separator, winding the laminate into a circular or flat spiral form to obtain a wound body, and inserting the wound body into a battery can and further injecting an electrolyte solution into it. Alternatively, it can be produced by a method in which a laminated body composed of separator sheets and electrodes, or a wound body obtained by folding the electrodes and separators, is placed in a battery container (for example, an aluminum film), which is then filled with an electrolyte solution.

The laminated body or wound body is preferably pressed during the procedure. Specifically, the separator for an electricity storage device may be overlaid and pressed with an electrode having a collector and an active material layer formed on at least one side of the collector, so that the thermoplastic polymer layer on the separator for an electricity storage device and the active material layer on the collector are facing each other. The pressing temperature may be between 25° C. and 120° C., or 50° C. to 100° C. The pressing may be carried out using an appropriate publicly known press apparatus such as a roll press or surface press.

The lithium-ion secondary battery produced in this manner has a coating layer with excellent heat resistance and strength, and is provided with a separator that has reduced ion resistance, and therefore it exhibits excellent safety and battery characteristics (especially rate characteristic). Moreover, when the thermoplastic polymer is provided on the outermost surface of the separator it exhibits excellent adhesion with electrodes, which minimizes detachment between the electrodes and separator that can occur during charge-discharge and allows homogeneous charge-discharge to be achieved, so that the resistance to continuous prolonged operation is excellent.

EXAMPLES

Evaluation of the physical properties in the experimental examples was carried out by the following methods.
<Evaluation>
(1) Solid Content Approximately 1 g of an aqueous dispersion of the obtained copolymer was precisely weighed out onto an aluminum pan, and the measured weight of the aqueous dispersion was recorded as (a) g. It was then dried for 1 hour with a hot air drier at 130° C., and the dry weight of the copolymer was recorded as (b) g. The solid content was calculated by the following formula.

Solid content=$(b)/(a) \times 100[\%]$ (2) Measurement of Polymer Particle Size

The mean particle size of the polymer particles was measured using a particle size measuring apparatus (Microtrac UPA150 by Nikkiso Co., Ltd.). The particle size was recorded as the value for the 50% particle size in data obtained under measuring conditions with a loading index of 0.15 to 0.3 and a measuring time of 300 seconds.
(3) Glass Transition Temperature Measurement An appropriate amount of the copolymer-containing aqueous dispersion (solid content=38 to 42 weight %, pH=9.0) for measurement was placed in an aluminum pan and dried for 30 minutes with a hot air drier at 130° C. Approximately 17 mg of the dried film sample was packed into an aluminum measuring container, and DSC and DDSC curves were obtained using a DSC measuring apparatus (DSC6220 by Shimadzu Corp.) under a nitrogen atmosphere. The measuring conditions were as follows.

Stage 1 heating program: Start=70° C., temperature increase at 15° C./min. Temperature maintained for 5 minutes after reaching 110° C.

Stage 2 cooling program: Temperature decrease from 110° C. at 40° C./min. Temperature maintained for 5 minutes after reaching −50° C.

Stage 3 heating program: Temperature increase from −50° C. to 130° C. at 15° C./min. Recording of DSC and DDSC data during stage 3 heating.

The intersection between the baseline (an extended straight line toward the high-temperature end from the baseline of the obtained DSC curve) and the tangent line at the inflection point (the point where the upwardly convex curve changed to a downwardly convex curve) was recorded as the glass transition temperature (Tg).
(4) Viscosity-Average Molecular Weight Mv The limiting viscosity [η] at 135° C. in a decalin solvent was determined according to ASTM-D4020. The [η] value was used to calculate the viscosity-average molecular weight Mv, from the following mathematical formulas.

For polyethylene: $[\eta]=0.00068 \times Mv^{0.67}$

For polypropylene: $[\eta]=1.10 \times Mv^{0.80}$ (5) Thickness (μm)

A 10 cm×10 cm-square sample was cut out from the polyolefin porous base material or separator, 9 locations (3 points×3 points) were selected in a lattice form, and a microthickness meter (Type KBM by Toyo Seiki Seisakusho, Ltd.) was used for measurement of the film thickness at room temperature (23±+2° C.). The average for the values measured at the 9 locations was calculated as the film thickness of the sample. In addition, the filler porous layer can be calculated by subtracting the thickness of the polyolefin porous base material from the thickness of the separator with the filler porous layer.
(6) Porosity A 10 cm×10 cm-square sample was cut out from the polyolefin porous base material, and the volume (cm$^3$) and weight (g) were determined. The values were used to calculate the porosity by the following formula:

Porosity (%)=(1−weight/volume/0.95)×100, using 0.95 (g/cm$^3$) as the density of the porous base material.
(7) Gas Permeability (Sec/100 cc)

The gas permeability was determined as the air permeability resistance measured with a Gurley air permeability tester (G-B2™ by Toyo Seiki Kogyo Co., Ltd.), according to JIS P-8117.
(8) Puncture Strength (g)

Using a Handy Compression Tester KES-G5™ by Kato Tech Corp., the polyolefin porous base material was anchored with a specimen holder having an opening diameter of 11.3 mm. Next, the center section of the anchored porous base material was subjected to a puncture test with a needle having a tip curvature radius of 0.5 mm, at a puncture speed of 2 mm/sec and a 25° C. atmosphere, the puncture strength (g) being obtained as the maximum puncture load.
(9) Inorganic Filler Particle Size (μm)

The particle size distribution of the coating solution comprising the inorganic filler was measured using a laser particle size distribution analyzer (Microtrac MT3300EX by Nikkiso Co., Ltd.), using the particle size with a cumulative frequency of 50% as the mean particle size (μm).
(10) Coating Layer Thickness (μm)

A MD 10 cm×TD 10 cm sample was cut out from the coated film and polyolefin microporous film base material, 9 locations (3 points×3 points) were selected on a lattice for measurement of the film thickness using a dial gauge (PEACOCK No. 25™ by Ozaki Manufacturing Co., Ltd.), and the average of the 9 measured values was recorded as the film thickness (μm) for the coated film and base material. The difference between the measured film thicknesses of the coated film and base material was recorded as the thickness (μm) of the coating layer.
(11) Coating Layer Peel Strength (N/cm)

Double-sided tape was attached to a glass slide with a width of 26 mm and a length of 76 mm, and the separator was attached over it with the coated surface on the double-sided tape side. A 180° peel test was carried out at a peel rate of 300 mm/min, with a pulling system using ZP5N and MX2-500N (product name) force gauges by Imada Co., Ltd., anchoring the slide glass and holding the separator, for measurement of the peel strength. The average for the peel strength in the peel test for a 40 mm length, carried out under the conditions described above, was used as the peel strength, for evaluation on the following scale.

VG (Very Good): peel strength of ≥2.0 N/cm
G (Good): Peel strength of ≥1.0 N/cm and <2.0 N/cm
F (Fair): Peel strength of ≥0.45 N/cm and <1.0 N/cm
P (Poor): Peel strength of <0.45 N/cm
(12) Alternating Current Electrical Resistance Six measuring samples cut out to 22 mmφ were thoroughly soaked with an electrolyte solution (1 M lithium perchlorate propylene carbonate/dimethyl carbonate=1/1), and one of the samples was placed in a covered stainless steel metal container. The container and cover were insulated without direct contact using TEFLON™ packing and a 15.95 mmφ TEFLON™ guide, being in contact only with an SUS electrode holder. The cover was closed using a torque wrench (clamping torque: 0.8 Nm). A "3522-50 LCR HighTester" by Hioki E.E. Corp. was used for measurement under conditions with a frequency of 100 Hz and an open voltage of 0.01 V, with the measuring cell placed in a −30° C. thermostatic bath. The resistance value obtained by the measurement was recorded as R1. Next, the measuring container was disassembled and the remaining 5 impregnated samples were stacked into the container, and after reassembly, the resistances of the 6 samples were measured under the same conditions. The film resistance obtained by each measurement was recorded as R6. The film resistance R (Ω·cm²) per sample was calculated by the following formula (1) from the obtained values R1 and R6.

$$R = (R6 - R1)/5 \qquad (1)$$

The alternating current electrical resistance (Ω/cm²) of the separator obtained by the formula was calculated as the resistance value in terms of a 20 μm film thickness, and the resistance increase rate from the alternating current electrical resistance $R_a$ of the base material before coating to the alternating current electrical resistance $R_b$ after coating, was determined by the following formula (2).

$$\text{Resistance increase rate } (\%) = \{(R_b - R_a)/R_a\} \times 100 \qquad (2)$$

The resistance increase rate was ranked on the following scale.
VG (Very good): Resistance increase rate of <50%
G (Good): Resistance increase rate of ≥50% and <100%
P (Poor): Resistance increase rate of ≥100%

(13) Rate Characteristic a. Fabrication of Positive Electrode

After mixing 90.4 weight % of a nickel, manganese and cobalt complex oxide (NMC) (Ni:Mn:Co=1:1:1 (element ratio), density: 4.70 g/cm³), as the positive electrode active material, 1.6 weight % of graphite powder (KS6) (density: 2.26 g/cm³, number-mean particle size: 6.5 μm) and 3.8 weight % of acetylene black powder (AB) (density: 1.95 g/cm³, number-mean particle size: 48 nm), as conductive aids, and 4.2 weight % of polyvinylidene fluoride (PVDF) (density: 1.75 g/cm³) as a binder, the mixture was dispersed in N-methylpyrrolidone (NMP) to prepare a slurry. The slurry was coated using a die coater onto one side of a 20 μm-thick aluminum foil sheet as the positive electrode collector, and dried at 130° C. for 3 minutes, after which it was compression molded using a roll press, to fabricate a positive electrode. The coating amount of the positive electrode active material was 109 g/m².

b. Fabrication of Negative Electrode

In purified water there were dispersed 87.6 weight % of graphite powder A (density: 2.23 g/cm³, number-mean particle size: 12.7 μm) and 9.7 weight % of graphite powder B (density: 2.27 g/cm³, number-mean particle size: 6.5 μm) as negative electrode active materials, and 1.4 (solid) weight % of carboxymethyl cellulose ammonium salt (1.83 weight % solid concentration aqueous solution) and 1.7 (solid) weight % of diene rubber latex (40 weight % solid concentration aqueous solution) as binders, to prepare a slurry. The slurry was coated using a die coater onto one side of a 12 μm-thick copper foil sheet as the negative electrode collector, and dried at 120° C. for 3 minutes, after which it was compression molded using a roll press to fabricate a negative electrode. The coating amount of the negative electrode active material was 5.2 g/m².

c. Preparation of Non-Aqueous Electrolyte Solution

A non-aqueous electrolyte solution was prepared by dissolving 1.0 mol/L concentrated LiPF$_6$, as a solute, in a mixed solvent of ethylene carbonate:ethylmethyl carbonate=1:2 (volume ratio).

d. Battery Assembly

The separators for an electricity storage device obtained in the examples and comparative examples were each cut out to a 24 mmφ circular shape, and positive electrode and negative electrodes were cut out to 16 mmφ circular shapes. The negative electrode, separator and positive electrode were stacked in that order with the active material sides of the positive electrode and negative electrode facing each other, and were then pressed or heat pressed and inserted into a covered stainless steel metal container. The container and cover were insulated, with the container in contact with the negative electrode copper foil and the cover in contact with the positive electrode aluminum foil. The non-aqueous electrolyte solution was injected into the container at 0.4 ml and sealed to assemble a battery.

e. Evaluation of Rate Characteristic

Each simple battery assembled in d. above was subjected to initial charging following battery fabrication, for a total of approximately 6 hours, by a method of charging to a cell voltage of 4.2 V at a current value of 3 mA (approximately 0.5 C) at 25° C., and then beginning to draw out the current value from 3 mA while maintaining 4.2 V. The battery was then discharged to a cell voltage of 3.0 V at a current value of 3 mA.

This was followed by charging for a total of approximately 3 hours, by a method of charging to a cell voltage of 4.2 V at a current value of 6 mA (approximately 1.0 C) at 25° C., and then beginning to draw out the current value from 6 mA while maintaining 4.2 V. The service capacity after discharge to a cell voltage of 3.0 V at a current value of 6 mA was recorded as the 1 C service capacity (mAh).

This was followed by charging for a total of approximately 3 hours, by a method of charging to a cell voltage of 4.2 V at a current value of 6 mA (approximately 1.0 C) at 25° C., and then beginning to draw out the current value from 6 mA while maintaining 4.2 V. The service capacity after discharge to a cell voltage of 3.0 V at a current value of 12 mA (approximately 2.0 C) was recorded as the 2 C service capacity (mAh).

The ratio of the 2 C service capacity with respect to the 1 C service capacity was calculated and the value recorded as the rate characteristic.

Rate characteristic (%)=(2 C service capacity/1 C service capacity)×100

The evaluation scale for the rate characteristic (%) was as follows.
VG (Very good): Rate characteristic of ≥95%.
G (Good): Rate characteristic of ≥85% and <95%.
P (Poor): Rate characteristic of <85%.

Production of Binder Composition for Electricity Storage Device (Aqueous Dispersion)

Comparative Example 1 (Aqueous Dispersion a1)

Into a reactor equipped with a stirrer, reflux condenser, drip tank and thermometer there were loaded 70.4 parts by weight of ion-exchanged water, 0.5 part by weight of "AQUALON KH1025" (registered trademark of Dai-ichi Kogyo Seiyaku Co., Ltd., 25% aqueous solution, listed as "KH1025" in the tables, same hereunder) as an emulsifier, and 0.5 part by weight of "ADEKA REASOAP SR1025"

(registered trademark of Adeka Corp., 25% aqueous solution, listed as "SR1025" in the tables, same hereunder). The internal temperature of the reactor was then raised to 80° C., and 7.5 parts by weight of a 2% aqueous solution of ammonium persulfate (listed as "APS (aq)" in the tables, same hereunder) was added while keeping the temperature at 80° C. Five minutes after addition of the ammonium persulfate aqueous solution was completed, the emulsified liquid was added dropwise from the drip tank into the reactor over a period of 150 minutes.

The emulsified liquid was prepared by forming a mixture of 25 parts by weight of cyclohexyl methacrylate (listed as "CHMA" in the tables, same hereunder) as a monomer to compose the cycloalkyl group-containing monomer unit (A), 1 part by weight of methacrylic acid (listed as "MAA" in the tables, same hereunder) as a monomer to compose the carboxyl group-containing monomer unit (b1), 1 part by weight of acrylic acid (listed as "AA" in the tables, same hereunder), 0.1 part by weight of acrylamide (listed as "AM" in the tables, same hereunder) as a monomer to compose the amide group-containing monomer unit (b2), 5 parts by weight of 2-hydroxyethyl methacrylate (listed as "2HEMA" in the tables, same hereunder) as a monomer to compose the hydroxyl group-containing monomer unit (b3), 0.5 part by weight of trimethylolpropane triacrylate (A-TMPT, product of Shin-Nakamura Chemical Co., Ltd., listed as "A-TMPT" in the tables, same hereunder) as a monomer to compose the crosslinkable monomer unit (b4), 4.9 parts by weight of methyl methacrylate (listed as "MMA" in the tables, same hereunder) as a monomer to compose a (meth)acrylic acid ester monomer unit (b5) other than those mentioned above, 1.5 parts by weight of butyl methacrylate (listed as "BMA" in the tables, same hereunder), 1.0 part by weight of butyl acrylate (listed as "BA" in the tables, same hereunder), 60 parts by weight of 2-ethylhexyl acrylate (listed as "2EHA" in the tables, same hereunder), 3 parts by weight of "AQUALON KH1025" (registered trademark of Dai-ichi Kogyo Seiyaku Co., Ltd., 25% aqueous solution), 3 parts by weight of "ADEKA REASOAP SR1025" (registered trademark of Adeka Corp., 25% aqueous solution) and 0.05 part by weight of sodium p-styrenesulfonate (listed as "NaSS" in the tables, same hereunder), as emulsifiers, 3.75 parts by weight of a 2% aqueous solution of ammonium persulfate, and 52 parts by weight of ion-exchanged water, and then mixing with a homomixer for 5 minutes.

Upon completion of the dropwise addition of the emulsified liquid, the internal temperature of the reactor was kept at 80° C. for a period of 90 minutes, after which it was cooled to room temperature. The obtained emulsion was adjusted to a pH of 8.0 with an ammonium hydroxide aqueous solution (25% aqueous solution), and then a small amount of water was added to obtain an aqueous dispersion with a solid content of 40% (aqueous dispersion a1). The copolymer in the obtained aqueous dispersion a1 was measured for mean particle size and glass transition temperature (Tg) by the methods described above. The results are shown in Table 1.

Examples 1 to 27 and Comparative Examples 2 to 4 (Aqueous Dispersions A1 to A27 and a2 to a4)

Aqueous dispersions A1 to A27 and a2 to a4 were obtained in basically the same manner as Synthesis Example 1, except that the types of starting materials and their mixing ratios were changed as shown in Tables 1 to 5.

Since addition of ammonia water during preparation of aqueous dispersions A13 and A22 produced the phenomenon of solidification of the aqueous dispersion, aqueous dispersions A13 and A22 were used without addition of ammonia.

The copolymers in the obtained aqueous dispersions A1 to A27 and a1 to a4 were then measured for particle size and glass transition temperature (Tg) by the methods described above. The obtained results are shown in Tables 1 to 5. The compositions of the starting materials in the tables are based on weight. The ethylenic unsaturated monomers with polyalkyleneglycol groups (P) that were used are listed in Table 6.

TABLE 1

|  |  |  |  | Aqueous dispersion | | | |
|---|---|---|---|---|---|---|---|
|  | Type |  | Starting material | Comp. Example 1 a1 | Comp. Example 2 a2 | Comp. Example 3 a3 | Comp. Example 4 a4 |
| Initial |  | Emulsifier | KH1025 | 0.5 | 0.5 | 0.5 | 0.5 |
|  |  |  | SR1025 | 0.5 | 0.5 | 0.5 | 0.5 |
|  |  | Ion-exchanged water | — | 70.4 | 70.4 | 70.4 | 70.4 |
|  |  | Initiator | APS (aq) | 7.5 | 7.5 | 7.5 | 7.5 |
| Emulsified liquid |  | Polyalkylene glycol group-containing monomer (P) | M-20G | 0 | 0 | 2.5 | 5 |
|  |  |  | M-40G | 0 | 0 | 0 | 0 |
|  |  |  | M-90G | 0 | 0 | 0 | 0 |
|  |  |  | M-230G | 0 | 0 | 0 | 0 |
|  |  | Cycloalkyl group-containing monomer (A) | CHMA | 25 | 5 | 30 | 30 |
|  | Other monomers (B) | Carboxyl group-containing monomer (b1) | MAA | 1 | 1 | 1 | 1 |
|  |  |  | AA | 1 | 1 | 1 | 1 |
|  |  | Amide group-containing monomer (b2) | AM | 0.1 | 0.1 | 0.1 | 0.1 |
|  |  | Hydroxyl group-containing monomer (b3) | HEMA | 5 | 5 | 5 | 5 |

TABLE 1-continued

|  |  | Aqueous dispersion | | | |
|---|---|---|---|---|---|
| Type | Starting material | Comp. Example 1 a1 | Comp. Example 2 a2 | Comp. Example 3 a3 | Comp. Example 4 a4 |
| Crosslinkable monomer (b4) | GMA | 0 | 0.4 | 0 | 0 |
|  | A-TMPT | 0.5 | 1 | 0.5 | 0.5 |
|  | MAPTMS | 0 | 0.5 | 0 | 0 |
|  | (b4) Total | 0.5 | 1.9 | 0.5 | 0.5 |
| (Meth)acrylic acid ester monomer (b5) | MMA | 4.9 | 12 | 1 | 1 |
|  | BMA | 1.5 | 3 | 0.4 | 0.4 |
|  | BA | 1 | 31 | 1 | 1 |
|  | 2EHA | 60 | 40 | 57.5 | 55 |
| (Meth)acrylic acid ester monomer total |  | 92.4 | 91.0 | 89.9 | 87.4 |
| (P) + (A) + (B) |  | 100.0 | 100.0 | 100.0 | 100.0 |
| Emulsifier | KH1025 | 3 | 3 | 3 | 3 |
|  | SR1025 | 3 | 3 | 3 | 3 |
|  | NaSS | 0.05 | 0.05 | 0.05 | 0.05 |
| Initiator | APS (aq) | 7.5 | 7.5 | 7.5 | 7.5 |
| Ion-exchanged water | — | 52 | 52 | 52 | 52 |
| Neutralizer |  | AW | AW | AW | AW |
| Particle size (50% particle size) (nm) |  | 160 | 160 | 160 | 160 |
| Glass transition temperature Tg (° C.) |  | −20 | −20 | −20 | −20 |

TABLE 2

|  |  |  | Aqueous dispersion | | | | | | |
|---|---|---|---|---|---|---|---|---|---|
|  | Type | Starting material | Example 1 A1 | Example 2 A2 | Example 3 A3 | Example 4 A4 | Example 5 A5 | Example 6 A6 | Example 7 A7 |
| Initial | Emulsifier | KH1025 | 0.5 | 0.5 | 0.5 | 0.5 | 0.5 | 0.5 | 0.5 |
|  |  | SR1025 | 0.5 | 0.5 | 0.5 | 0.5 | 0.5 | 0.5 | 0.5 |
|  | Ion-exchanged water | — | 70.4 | 70.4 | 70.4 | 70.4 | 70.4 | 70.4 | 70.4 |
|  | Initiator | APS (aq) | 7.5 | 7.5 | 7.5 | 7.5 | 7.5 | 7.5 | 7.5 |
| Emulsified liquid | Polyalkylene glycol group-containing monomer (P) | M-20G | 0 | 0 | 0 | 0 | 0 | 0 | 0 |
|  |  | M-40G | 2.5 | 5 | 0 | 0 | 5 | 5 | 5 |
|  |  | M-90G | 0 | 0 | 5 | 0 | 0 | 0 | 0 |
|  |  | M-230G | 0 | 0 | 0 | 5 | 0 | 0 | 0 |
|  | Cycloalkyl group-containing monomer (A) | CHMA | 30 | 30 | 30 | 30 | 30 | 30 | 30 |
| Other monomers (B) | Carboxyl group-containing monomer (b1) | MAA | 1 | 1 | 1 | 1 | 1 | 1 | 1 |
|  |  | AA | 1 | 1 | 1 | 1 | 1 | 1 | 1 |
|  | Amide group-containing monomer (b2) | AM | 0.1 | 0.1 | 0.1 | 0.1 | 0.1 | 0.1 | 0.1 |
|  | Hydroxyl group-containing monomer (b3) | HEMA | 5 | 5 | 5 | 5 | 5 | 5 | 5 |
|  | Crosslinkable monomer (b4) | GMA | 0 | 0 | 0 | 0 | 0 | 0.4 | 0 |
|  |  | A-TMPT | 0.5 | 0.5 | 0.5 | 0.5 | 0.1 | 1 | 0 |
|  |  | MAPTMS | 0 | 0 | 0 | 0 | 0 | 0 | 1 |
|  |  | (b4) Total | 0.5 | 0.5 | 0.5 | 0.5 | 0.1 | 1.4 | 1 |
|  | (Meth)acrylic acid ester monomer (b5) | MMA | 1 | 1 | 1 | 1 | 1 | 1 | 1 |
|  |  | BMA | 0.4 | 0.4 | 0.4 | 0.4 | 0.8 | 0.4 | 0.8 |
|  |  | BA | 1 | 1 | 1 | 1 | 1 | 0.1 | 0.1 |
|  |  | 2EHA | 57.5 | 55 | 55 | 55 | 55 | 55 | 55 |
| (Meth)acrylic acid ester monomer total |  |  | 92.4 | 92.4 | 92.4 | 92.4 | 92.8 | 91.5 | 91.9 |
| (P) + (A) + (B) |  |  | 100.0 | 100.0 | 100.0 | 100.0 | 100.0 | 100.0 | 100.0 |
| Emulsifier |  | KH1025 | 3 | 3 | 3 | 3 | 3 | 3 | 3 |
|  |  | SR1025 | 3 | 3 | 3 | 3 | 3 | 3 | 3 |
|  |  | NaSS | 0.05 | 0.05 | 0.05 | 0.05 | 0.05 | 0.05 | 0.05 |
| Initiator |  | APS (aq) | 7.5 | 7.5 | 7.5 | 7.5 | 7.5 | 7.5 | 7.5 |
| Ion-exchanged water |  | — | 52 | 52 | 52 | 52 | 52 | 52 | 52 |
| Neutralizer |  |  | AW | AW | AW | AW | AW | AW | AW |
| Particle size (50% particle size) (nm) |  |  | 160 | 160 | 160 | 160 | 160 | 160 | 160 |
| Glass transition temperature Tg (° C.) |  |  | −20 | −20 | −20 | −20 | −20 | −20 | −20 |

TABLE 3

| | | | Aqueous dispersion | | | | | | |
|---|---|---|---|---|---|---|---|---|---|
| | Type | Starting material | Example 8 A8 | Example 9 A9 | Example 10 A10 | Example 11 A11 | 3Example 12 A12 | Example 13 A13 | Example 14 A14 |
| Initial | Emulsifier | KH1025 | 0.5 | 0.5 | 0.5 | 0.5 | 0.5 | 0.5 | 0.5 |
| | | SR1025 | 0.5 | 0.5 | 0.5 | 0.5 | 0.5 | 0.5 | 0.5 |
| | Ion-exchanged water | — | 70.4 | 70.4 | 70.4 | 70.4 | 70.4 | 70.4 | 70.4 |
| | Initiator | APS (aq) | 7.5 | 7.5 | 7.5 | 7.5 | 7.5 | 7.5 | 7.5 |
| Emulsified liquid | Polyalkylene glycol group-containing monomer (P) | M-20G | 0 | 0 | 0 | 0 | 0 | 0 | 0 |
| | | M-40G | 10 | 0 | 15 | 20 | 30 | 50 | 5 |
| | | M-90G | 0 | 10 | 0 | 0 | 0 | 0 | 0 |
| | | M-230G | 0 | 0 | 0 | 0 | 0 | 0 | 0 |
| | Cycloalkyl group-containing monomer (A) | CHMA | 30 | 30 | 30 | 30 | 30 | 30 | 5 |
| Other monomers (B) | Carboxyl group-containing monomer (b1) | MAA | 1 | 1 | 1 | 1 | 1 | 1 | 1 |
| | | AA | 1 | 1 | 1 | 1 | 1 | 1 | 1 |
| | Amide group-containing monomer (b2) | AM | 0.1 | 0.1 | 0.1 | 0.1 | 0.1 | 0.1 | 0.1 |
| | Hydroxyl group-containing monomer (b3) | HEMA | 5 | 5 | 5 | 5 | 5 | 5 | 5 |
| | Crosslinkable monomer (b4) | GMA | 0 | 0 | 0 | 0 | 0 | 0 | 0.4 |
| | | A-TMPT | 0.5 | 0.5 | 0.5 | 0.5 | 0.5 | 0.5 | 1 |
| | | MAPTMS | 0 | 0 | 0 | 0 | 0 | 0 | 0.5 |
| | (b4) Total | | 0.5 | 0.5 | 0.5 | 0.5 | 0.5 | 0.5 | 1.9 |
| | (Meth)acrylic acid ester monomer (b5) | MMA | 1 | 1 | 1 | 1 | 1 | 1 | 12 |
| | | BMA | 0.4 | 0.4 | 0.4 | 0.4 | 0.4 | 0.4 | 3 |
| | | BA | 1 | 1 | 1 | 1 | 1 | 1 | 31 |
| | | 2EHA | 50 | 50 | 45 | 40 | 30 | 10 | 35 |
| | (Meth)acrylic acid ester monomer total | | 92.4 | 92.4 | 92.4 | 92.4 | 92.4 | 92.4 | 91.0 |
| | (P) + (A) + (B) | | 100.0 | 100.0 | 100.0 | 100.0 | 100.0 | 100.0 | 100.0 |
| | Emulsifier | KH1025 | 3 | 3 | 3 | 3 | 3 | 3 | 3 |
| | | SR1025 | 3 | 3 | 3 | 3 | 3 | 3 | 3 |
| | | NaSS | 0.05 | 0.05 | 0.05 | 0.05 | 0.05 | 0.05 | 0.05 |
| | Initiator | APS (aq) | 7.5 | 7.5 | 7.5 | 7.5 | 7.5 | 7.5 | 7.5 |
| | Ion-exchanged water | — | 52 | 52 | 52 | 52 | 52 | 52 | 52 |
| | Neutralizer | | AW | AW | AW | AW | AW | None | AW |
| Particle size (50% particle size) (nm) | | | 160 | 160 | 160 | 160 | 160 | 160 | 160 |
| Glass transition temperature Tg (° C.) | | | −20 | −20 | −20 | −20 | −20 | −20 | −20 |

TABLE 4

| | | | Aqueous dispersion | | | |
|---|---|---|---|---|---|---|
| | Type | Starting material | Example 15 A15 | Example 16 A16 | Example 17 A17 | Example 18 A18 |
| Initial | Emulsifier | KH1025 | 0.5 | 0.5 | 0.5 | 0.5 |
| | | SR1025 | 0.5 | 0.5 | 0.5 | 0.5 |
| | Ion-exchanged water | — | 70.4 | 70.4 | 70.4 | 70.4 |
| | Initiator | APS (aq) | 7.5 | 7.5 | 7.5 | 7.5 |
| Emulsified liquid | Polyalkylene glycol group-containing monomer (P) | AM-30G | 5 | 0 | 0 | 0 |
| | | M-30PG | 0 | 5 | 0 | 0 |
| | | 4G | 0 | 0 | 5 | 0 |
| | | 9G | 0 | 0 | 0 | 5 |
| | Cycloalkyl group-containing monomer (A) | CHMA | 30 | 30 | 30 | 30 |
| Other monomers (B) | Carboxyl group-containing monomer (b1) | MAA | 1 | 1 | 1 | 1 |
| | | AA | 1 | 1 | 1 | 1 |
| | Amide group-containing monomer (b2) | AM | 0.1 | 0.1 | 0.1 | 0.1 |
| | Hydroxyl group-containing monomer (b3) | HEMA | 5 | 5 | 5 | 5 |

TABLE 4-continued

| | | Aqueous dispersion | | | |
|---|---|---|---|---|---|
| Type | Starting material | Example 15 A15 | Example 16 A16 | Example 17 A17 | Example 18 A18 |
| Crosslinkable monomer (b4) | GMA | 0 | 0 | 0 | 0 |
| | A-TMPT | 0.5 | 0.5 | 0.5 | 0.5 |
| | MAPTMS | 0 | 0 | 0 | 0 |
| | (b4) Total | 0.5 | 0.5 | 0.5 | 0.5 |
| (Meth)acrylic acid ester monomer (b5) | MMA | 1 | 1 | 1 | 1 |
| | BMA | 0.4 | 0.4 | 0.4 | 0.4 |
| | BA | 1 | 1 | 1 | 1 |
| | 2EHA | 55 | 55 | 55 | 55 |
| (Meth)acrylic acid ester monomer total | | 92.4 | 92.4 | 92.4 | 92.4 |
| (P) + (A) + (B) | | 100.0 | 100.0 | 100.0 | 100.0 |
| Emulsifier | KH1025 | 3 | 3 | 3 | 3 |
| | SR1025 | 3 | 3 | 3 | 3 |
| | NaSS | 0.05 | 0.05 | 0.05 | 0.05 |
| Initiator | APS (aq) | 7.5 | 7.5 | 7.5 | 7.5 |
| Ion-exchanged water | — | 52 | 52 | 52 | 52 |
| Neutralizer | | AW | AW | AW | AW |
| Particle size (50% particle size) (nm) | | 160 | 160 | 160 | 160 |
| Glass transition temperature Tg (° C.) | | −20 | −20 | −15 | −20 |

TABLE 5

| | | | Aqueous dispersion | | | | |
|---|---|---|---|---|---|---|---|
| Type | | Starting material | Example 19 A19 | Example 20 A20 | Example 21 A21 | Example 22 A22 | Example 23 A23 |
| Initial | Emulsifier | KH1025 | 0.5 | 0.5 | 0.5 | 0.5 | 0.5 |
| | | SR1025 | 0.5 | 0.5 | 0.5 | 0.5 | 0.5 |
| | Ion-exchanged water | — | 70.4 | 70.4 | 70.4 | 70.4 | 70.4 |
| | Initiator | APS (aq) | 7.5 | 7.5 | 7.5 | 7.5 | 7.5 |
| Emulsified liquid | Polyalkylene glycol group-containing monomer (P) | M-20G | 0 | 0 | 0 | 0 | 0 |
| | | M-40G | 10 | 30 | 30 | 50 | 50 |
| | | M-90G | 0 | 0 | 0 | 0 | 0 |
| | | M-230G | 0 | 0 | 0 | 0 | 0 |
| | Cycloalkyl group-containing monomer (A) | CHMA | 30 | 30 | 30 | 30 | 30 |
| Other monomers (B) | Carboxyl group-containing monomer (b1) | MAA | 2 | 0.5 | 0.3 | 0.5 | 0 |
| | | AA | 1 | 0.5 | 0.2 | 0.5 | 0 |
| | Amide group-containing monomer (b2) | AM | 0.1 | 0.1 | 0.1 | 0.1 | 0.1 |
| | Hydroxyl group-containing monomer (b3) | HEMA | 5 | 5 | 5 | 5 | 5 |
| | Crosslinkable monomer (b4) | GMA | 0 | 0 | 0 | 0 | 0 |
| | | A-TMPT | 0.5 | 0.5 | 0.5 | 0.5 | 0.5 |
| | | MAPTMS | 0 | 0 | 0 | 0 | 0 |
| | | (b4) Total | 0.5 | 0.5 | 0.5 | 0.5 | 0.5 |
| | (Meth)acrylic acid ester monomer (b5) | MMA | 0 | 2 | 2.5 | 2 | 3 |
| | | BMA | 0.4 | 0.4 | 0.4 | 0.4 | 0.4 |
| | | BA | 1 | 1 | 1 | 1 | 1 |
| | | 2EHA | 50 | 30 | 30 | 10 | 10 |
| (Meth)acrylic acid ester monomer total | | | 91.4 | 93.4 | 93.9 | 93.4 | 94.4 |
| (P) + (A) + (B) | | | 100.0 | 100.0 | 100.0 | 100.0 | 100.0 |
| | Emulsifier | KH1025 | 3 | 3 | 3 | 3 | 3 |
| | | SR1025 | 3 | 3 | 3 | 3 | 3 |
| | | NaSS | 0.05 | 0.05 | 0.05 | 0.05 | 0.05 |
| | Initiator | APS (aq) | 7.5 | 7.5 | 7.5 | 7.5 | 7.5 |
| | Ion-exchanged water | — | 52 | 52 | 52 | 52 | 52 |
| | Neutralizer | | AW | AW | AW | None | AW |
| Particle size (50% particle size) (nm) | | | 160 | 160 | 160 | 160 | 160 |
| Glass transition temperature Tg (° C.) | | | −20 | −20 | −20 | −20 | −20 |

TABLE 5-continued

|  |  |  | Aqueous dispersion | | | |
|---|---|---|---|---|---|---|
| Type | | Starting material | Example 24 A24 | Example 25 A25 | Example 26 A26 | Example 27 A27 |
| Initial | Emulsifier | KH1025 | 0.5 | 0.5 | 0.5 | 0.5 |
|  |  | SR1025 | 0.5 | 0.5 | 0.5 | 0.5 |
|  | Ion-exchanged water |  | 70.4 | 70.4 | 70.4 | 70.4 |
|  | Initiator | APS (aq) | 7.5 | 7.5 | 7.5 | 7.5 |
| Emulsified liquid | Polyalkylene glycol group-containing monomer (P) | M-20G | 0 | 0 | 0 | 0 |
|  |  | M-40G | 10 | 10 | 10 | 10 |
|  |  | M-90G | 0 | 0 | 0 | 0 |
|  |  | M-230G | 0 | 0 | 0 | 0 |
|  | Cycloalkyl group-containing monomer (A) | CHMA | 20 | 10 | 30 | 30 |
|  | Other monomers (B) Carboxyl group-containing monomer (b1) | MAA | 1 | 1 | 1 | 1 |
|  |  | AA | 1 | 1 | 1 | 1 |
|  | Amide group-containing monomer (b2) | AM | 0.1 | 0.1 | 0.1 | 1 |
|  | Hydroxyl group-containing monomer (b3) | HEMA | 5 | 5 | 1 | 5 |
|  | Crosslinkable monomer (b4) | GMA | 0 | 0 | 0 | 0 |
|  |  | A-TMPT | 0.5 | 0.5 | 0.5 | 0.5 |
|  |  | MAPTMS | 0 | 0 | 0 | 0 |
|  | (b4) Total |  | 0.5 | 0.5 | 0.5 | 0.5 |
|  | (Meth)acrylic acid ester monomer (b5) | MMA | 1 | 1 | 2 | 0.1 |
|  |  | BMA | 0.4 | 0.4 | 3.4 | 0.4 |
|  |  | BA | 1 | 1 | 1 | 1 |
|  |  | 2EHA | 60 | 70 | 50 | 50 |
|  | (Meth)acrylic acid ester monomer total |  | 92.4 | 92.4 | 96.4 | 91.5 |
|  | (P) + (A) + (B) |  | 100.0 | 100.0 | 100.0 | 100.0 |
|  | Emulsifier | KH1025 | 3 | 3 | 3 | 3 |
|  |  | SR1025 | 3 | 3 | 3 | 3 |
|  |  | NaSS | 0.05 | 0.05 | 0.05 | 0.05 |
|  | Initiator | APS (aq) | 7.5 | 7.5 | 7.5 | 7.5 |
|  | Ion-exchanged water |  | 52 | 52 | 52 | 52 |
|  | Neutralizer |  | AW | AW | AW | AW |
|  | Particle size (50% particle size) (nm) |  | 160 | 160 | 160 | 160 |
|  | Glass transition temperature Tg (° C.) |  | −30 | −40 | −20 | −20 |

TABLE 6

| Name | Average number of repeating units (n) | Substance |
|---|---|---|
| M-20G | 2 | Methoxydiethyleneglycol methacrylate |
| M-40G | 4 | Methoxypolyethyleneglycol methacrylate |
| M-90G | 9 | Methoxypolyethyleneglycol methacrylate |
| M-230G | 23 | Methoxypolyethyleneglycol methacrylate |
| AM-30G | 3 | Methoxytriethyleneglycol acrylate |
| M-30PG | 3 | Methoxypolypropyleneglycol methacrylate |
| 4G | 4 | Polyethyleneglycol dimethacrylate |
| 9G | 9 | Polyethyleneglycol dimethacrylate |

The abbreviations for the materials used as shown in Table 1 to 6 have the following meanings.
(Emulsifiers)
KH1025: AQUALON KH1025, trade name of Dai-ichi Kogyo Seiyaku Co., Ltd., 25 weight % aqueous solution.
SR1025: ADEKA REASOAP SR1025, trade name of Adeka Corp., 25 weight % aqueous solution.
NaSS: Sodium p-styrenesulfonate
(Initiator)
APS: Ammonium persulfate (2 weight % aqueous solution)
(Neutralizer)
AW: Ammonium hydroxide
(Monomers)
Cycloalkyl group-containing monomer (A)
CHMA: Cyclohexyl methacrylate
Carboxyl group-containing monomer (b1)
MAA: Methacrylic acid
AA: Acrylic acid
Amide group-containing monomer (b2)
AM: Acrylamide
Hydroxyl group-containing monomer (b3)
HEMA: 2-Hydroxyethyl methacrylate
Crosslinkable monomer (b4)
GMA: Glycidyl methacrylate
A-TMPT: Trimethylolpropane triacrylate
MAPTMS: Methacryloxypropyltrimethoxysilane
Acrylic acid ester monomer (b5)
MMA: Methyl methacrylate
BMA: Butyl methacrylate
BA: n-Butyl acrylate
2EHA: 2-Ethylhexyl acrylate <Production of Polyolefin Porous Base Material>
[Polyolefin Porous Base Material B1]

High-density polyethylene homopolymer with a My of 700,000, at 45 parts by weight, high-density polyethylene homopolymer with a My of 300,000, at 45 parts by weight, and polypropylene homopolymer with a My of 400,000, at 5 parts by weight, were dry blended using a tumbler blender. To 99 parts by weight of the obtained polyolefin mixture there was added 1 part by weight of tetrakis-[methylene-(3′,5′-di-t-butyl-4′-hydroxyphenyl)propionate]methane as an antioxidant, and a tumbler blender was again used for dry blending to obtain a mixture. The obtained mixture was supplied to a twin-screw extruder through a feeder, under a nitrogen atmosphere. Also, liquid paraffin (kinematic viscosity at 37.78° C.: 7.59×10$^{-5}$ m$^2$/s) was injected into the extruder cylinder by a plunger pump. The operating conditions for the feeder and pump were adjusted for a liquid paraffin content of 65 parts by weight and a polymer concentration of 35 parts by weight in the total mixture to be extruded.

The contents were then melt kneaded in the twin-screw extruder while heating to 230° C., the obtained melt kneaded mixture was extruded through a T-die onto a cooling roll controlled to a surface temperature of 80° C., and the extruded mixture was contacted with a cooling roll for casting and cooled to solidification to obtain a cast sheet. The sheet was stretched to a factor of 7×6.4 with a simultaneous biaxial stretcher at a temperature of 112° C. The stretched sheet was then immersed in methylene chloride for extraction removal of the liquid paraffin and dried, and then a tenter stretcher was used for stretching to a stretch ratio of 2 in the transverse direction at a temperature of 130° C. The stretched sheet was then relaxed to approximately 10% in the transverse direction and subjected to heat treatment to obtain a polyolefin porous base material B1. The physical properties of base material B1 are shown in Table 7.

TABLE 7

|  | Base material B1 |
|---|---|
| Basis weight (g/m$^2$) | 7.0 |
| Film thickness (μm) | 12 |
| Porosity (%) | 40 |
| Gas permeability (sec/100 cc) | 150 |
| Puncture strength (g) | 320 |

Production of Separator for an Electricity Storage Device

Example 28 (Separator S1)

A coating solution was prepared by evenly dispersing 96.0 parts by weight of aluminum hydroxide oxide (mean particle size: 1.0 μm), 3.0 parts by weight of the binder for an electricity storage device A1 and 1.0 part by weight of an ammonium polycarboxylate aqueous solution (SN Dispersant 5468 by San Nopco, Ltd.) in 100 parts by weight of water. The coating solution was then coated onto the surface of the polyolefin porous base material B1 using a gravure coater. It was then dried at 60° C. to remove the water. This formed an aluminum hydroxide oxide layer (inorganic filler porous layer) on the polyolefin porous base material B1 to a thickness of 4 μm, to obtain separator S1.

Examples 29 to 66 and Comparative Examples 5 to 11 (Separators S2 to S46)

Separators S2 to S46 were fabricated by the same method as S1, with the compositions shown in Tables 8 to 12. For each of the separators S13, S22 and S23, formation of a jelly-like released substance at the sections of the gravure coating machine contacting the liquid was confirmed after fabrication of the separator.

Lithium-ion secondary batteries were assembled in the manner described above using the obtained separators, and were used for the evaluations. The evaluation results are shown in Tables 8 to 12. FIG. 1 shows a graph representing peel strength (N/cm) of the coating layer with respect to number of repeating units of PEG groups, for the representative separators.

TABLE 8

|  |  |  | Example 28 | Example 29 | Example 30 | Example 31 | Example 32 |
|---|---|---|---|---|---|---|---|
|  | Separator No. |  | S1 | S2 | S3 | S4 | S5 |
|  | Base material No. |  | B1 | B1 | B1 | B1 | B1 |
| Coating solution | Composition | Filler | Aluminum hydroxide oxide | Aluminum hydroxide oxide | Aluminum hydroxide oxide | Aluminum hydroxide oxide | Aluminum hydroxide oxide |
|  |  | Mean particle size μm | 1 | 1 | 1 | 1 | 1 |
|  |  | Resin binder (aqueous dispersion No.) | A1 | A2 | A3 | A4 | A5 |
|  |  | Blending ratio % | 3 | 3 | 3 | 3 | 3 |
|  | Coating thickness | μm | 4 | 4 | 4 | 4 | 4 |
|  | Coating layer peel strength |  | F | F | F | F | F |
|  | Electrical resistance increase rate |  | G | G | G | G | G |
|  | Rate characteristic |  | G | G | G | G | G |

|  |  |  | Example 33 | Example 34 | Example 35 | Example 36 | Example 37 |
|---|---|---|---|---|---|---|---|
|  | Separator No. |  | S6 | S7 | S8 | S9 | S10 |
|  | Base material No. |  | B1 | B1 | B1 | B1 | B1 |
| Coating solution | Composition | Filler | Aluminum hydroxide oxide | Aluminum hydroxide oxide | Aluminum hydroxide oxide | Aluminum hydroxide oxide | Aluminum hydroxide oxide |
|  |  | Mean particle size μm | 1 | 1 | 1 | 1 | 1 |

TABLE 8-continued

|  |  |  |  |  |  |  |
|---|---|---|---|---|---|---|
| Resin binder (aqueous dispersion No.) |  | A6 | A7 | A8 | A9 | A10 |
| Blending ratio | % | 3 | 3 | 3 | 3 | 3 |
| Coating thickness | μm | 4 | 4 | 4 | 4 | 4 |
| Coating layer peel strength |  | F | F | F | F | F |
| Electrical resistance increase rate |  | G | G | VG | VG | VG |
| Rate characteristic |  | G | G | VG | VG | VG |

TABLE 9

|  |  |  | Example 38 | Example 39 | Example 40 | Example 41 | Example 42 | Example 43 | Example 44 | Example 45 | Example 46 | Example 47 |
|---|---|---|---|---|---|---|---|---|---|---|---|---|
| | Separator No. | | S11 | S12 | S13 | S14 | S15 | S16 | S17 | S18 | S19 | S20 |
| | Base material No. | | B1 | B1 | B1 | B1 | B1 | B1 | B1 | B1 | B1 | B1 |
| Coating solution | Composition | Filler | Aluminum hydroxide oxide | Aluminum hydroxide oxide | Aluminum hydroxide oxide | Aluminum hydroxide oxide | Aluminum hydroxide oxide | Aluminum hydroxide oxide | Aluminum hydroxide oxide | Aluminum hydroxide oxide | Aluminum hydroxide oxide | Aluminum hydroxide oxide |
| | | Mean particle size μm | 1 | 1 | 1 | 1 | 1 | 1 | 1 | 1 | 1 | 1 |
| | | Resin binder (aqueous dispersion No.) | A11 | A12 | A13 | A14 | A15 | A16 | A17 | A18 | A19 | A20 |
| | | Blending ratio % | 3 | 3 | 3 | 3 | 3 | 3 | 3 | 3 | 3 | 3 |
| | Coating thickness μm | | 4 | 4 | 4 | 4 | 4 | 4 | 4 | 4 | 4 | 4 |
| | Coating layer peel strength | | F | F | F | F | F | F | F | F | F | F |
| | Electrical resistance increase rate | | VG | VG | VG | G | G | G | G | G | VG | VG |
| | Rate characteristic | | VG | VG | VG | G | G | G | G | G | VG | VG |

TABLE 10

|  |  |  | Example 48 | Example 49 | Example 50 | Example 51 | Example 52 | Example 53 | Example 54 | Example 55 | Example 56 | Example 57 |
|---|---|---|---|---|---|---|---|---|---|---|---|---|
| | Separator No. | | S21 | S22 | S23 | S24 | S25 | S26 | S27 | S28 | S29 | S30 |
| | Base material No. | | B1 | B1 | B1 | B1 | B1 | B1 | B1 | B1 | B1 | B1 |
| Coating solution | Composition | Filler | Aluminum hydroxide oxide | Aluminum hydroxide oxide | Aluminum hydroxide oxide | Aluminum hydroxide oxide | Aluminum hydroxide oxide | Aluminum hydroxide oxide | Aluminum hydroxide oxide | Aluminum hydroxide oxide | Aluminum hydroxide oxide | Aluminum hydroxide oxide |
| | | Mean particle size μm | 1 | 1 | 1 | 1 | 1 | 1 | 1 | 1 | 1 | 1 |
| | | Resin binder (aqueous dispersion No.) | A21 | A22 | A23 | A24 | A25 | A26 | A27 | A8 | A8 | A8 |
| | | Blending ratio % | 3 | 3 | 3 | 3 | 3 | 3 | 3 | 2 | 5 | 10 |
| | Coating thickness μm | | 4 | 4 | 4 | 4 | 4 | 4 | 4 | 4 | 4 | 4 |
| | Coating layer peel strength | | F | F | F | F | F | F | F | F | G | VG |
| | Electrical resistance increase rate | | VG | VG | VG | VG | VG | VG | VG | VG | VG | G |
| | Rate characteristic | | VG | VG | VG | VG | VG | VG | VG | VG | VG | G |

TABLE 11

|  | Example 58 | Example 59 | Example 60 | Example 61 | Example 62 | Example 63 | Example 64 | Example 65 | Example 66 |
|---|---|---|---|---|---|---|---|---|---|
| Separator No. | S31 | S32 | S33 | S34 | S35 | S36 | S37 | S38 | S39 |
| Base material No. | B1 | B1 | B1 | B1 | B1 | B1 | B1 | B1 | B1 |

TABLE 11-continued

|  |  |  | Example 58 | Example 59 | Example 60 | Example 61 | Example 62 | Example 63 | Example 64 | Example 65 | Example 66 |
|---|---|---|---|---|---|---|---|---|---|---|---|
| Coating solution | Composition | Filler | Aluminum hydroxide oxide | Aluminum hydroxide oxide | Aluminum hydroxide oxide | Aluminum hydroxide oxide | Calcined kaolin | Calcined kaolin | Alumina | Alumina | Alumina |
|  |  | Mean particle size μm | 1 | 1 | 1 | 0.5 | 1 | 1 | 1 | 0.5 | 0.5 |
|  |  | Resin binder (aqueous dispersion No.) | A12 | A8 | A8 | A8 | A8 | A8 | A8 | A8 | A12 |
|  |  | Blending ratio % | 10 | 5 | 5 | 5 | 3 | 5 | 3 | 5 | 5 |
| Coating thickness | | μm | 4 | 10 | 2 | 1 | 4 | 4 | 4 | 1 | 4 |
| Coating layer peel strength | | | VG | G | G | G | F | G | F | G | G |
| Electrical resistance increase rate | | | G | G | VG | VG | VG | VG | VG | VG | VG |
| Rate characteristic | | | G | G | VG | VG | VG | VG | VG | VG | VG |

TABLE 12

|  |  |  | Comp. Example 5 | Comp. Example 6 | Comp. Example 7 | Comp. Example 8 | Comp. Example 9 | Comp. Example 10 | Comp. Example 11 |
|---|---|---|---|---|---|---|---|---|---|
| Separator No. | | | S40 | S41 | S42 | S43 | S44 | S45 | S46 |
| Base material No. | | | B1 | B1 | B1 | B1 | B1 | B1 | B1 |
| Coating solution | Composition | Filler | Aluminum hydroxide oxide | Aluminum hydroxide oxide | Aluminum hydroxide oxide | Aluminum hydroxide oxide | Aluminum hydroxide oxide | Aluminum hydroxide oxide | Aluminum hydroxide oxide |
|  |  | Mean particle size μm | 1 | 1 | 1 | 1 | 1 | 1 | 1 |
|  |  | Resin binder (aqueous dispersion No.) | a1 | a2 | a3 | a4 | a1 | a1 | a1 |
|  |  | Blending ratio % | 3 | 3 | 3 | 3 | 5 | 10 | 3 |
| Coating thickness | | μm | 4 | 4 | 4 | 4 | 4 | 4 | 10 |
| Coating layer peel strength | | | P | P | P | P | P | VG | P |
| Electrical resistance increase rate | | | G | G | G | G | G | P | P |
| Rate characteristic | | | G | G | G | G | G | P | P |

Fabrication of Positive Electrode and Negative Electrode, and Lithium-Ion Secondary Battery Using Them Example 67

(Positive Electrode Production Example)

After mixing 90.4 weight % of a nickel, manganese and cobalt complex oxide (NMC) (Ni:Mn:Co=1:1:1 (element ratio), density: 4.70 g/cm$^3$), as the positive electrode active material, 1.6 weight % of graphite powder (KS6) (density: 2.26 g/cm$^3$, number-mean particle size: 6.5 μm) and 3.8 weight % of acetylene black powder (AB) (density: 1.95 g/cm$^3$, number-mean particle size: 48 nm), as conductive aids, and 4.2 weight % of aqueous dispersion A8 as a binder, the mixture was mixed with water to prepare a slurry. The slurry was coated using a die coater onto one side of a 20 μm-thick aluminum foil sheet as the positive electrode collector, and dried at 120° C. for 3 minutes, after which it was compression molded using a roll press, to fabricate a positive electrode. The coating amount of the positive electrode active material was 109 g/m$^2$.

(Negative Electrode Production Example)

In purified water there were dispersed 87.6 weight % of graphite powder A (density: 2.23 g/cm$^3$, number-mean particle size: 12.7 μm) and 9.7 weight % of graphite powder B (density: 2.27 g/cm$^3$, number-mean particle size: 6.5 μm) as negative electrode active materials, and 1.4 (solid) weight % of carboxymethyl cellulose ammonium salt (1.83 weight % solid concentration aqueous solution) and 1.7 (solid) weight % of aqueous dispersion A8 (40 weight % solid concentration aqueous solution) as binders, to prepare a slurry. The slurry was coated using a die coater onto one side of a 12 μm-thick copper foil sheet as the negative electrode collector, and dried at 120° C. for 3 minutes, after which it was compression molded using a roll press to fabricate a negative electrode. The coating amount of the negative electrode active material was 5.2 g/m$^2$.

(Lithium-Ion Secondary Battery Production Example)

A lithium-ion secondary battery was assembled using the positive electrode and negative electrode produced as described above and separator S2 fabricated in Example 29 as a separator, and it was subjected to the different evaluations. The evaluation results are shown in Table 13.

TABLE 13

|  | Example 67 |
| --- | --- |
| Binder for electrode | A8 |
| Separator No. | S2 |
| Rate characteristic | VG |

What is claimed is:

1. A binder for an electricity storage device comprising a copolymer having an ethylenic unsaturated monomer having a polyalkyleneglycol group (P) and a monomer without a polyalkyleneglycol group that is copolymerizable with the ethylenic unsaturated monomer having a polyalkyleneglycol group (P) as a monomer unit,
   wherein the average number of repeating units (n) of said polyalkyleneglycol group of the ethylenic unsaturated monomer having a polyalkyleneglycol group (P) is 3 or greater,
   wherein the monomer without a polyalkyleneglycol group comprises ethylenic unsaturated monomers with an amide group (b2) at 0.1 to 10 weight % with respect to 100 weight % of the copolymer,
   wherein the monomer without a polyalkyleneglycol group further comprises an ethylenic unsaturated monomer with a cycloalkyl group (A) and a (meth)acrylic acid ester monomer (b5), and
   wherein the total amount of the ethylenic unsaturated monomer with a cycloalkyl group (A) and the (meth)acrylic acid ester monomer (b5) is 50 to 98 weight % with respect to 100 weight % of the copolymer.

2. The binder for an electricity storage device according to claim 1, wherein the copolymer has, as monomer units, 2 to 50 weight % of the ethylenic unsaturated monomer having a polyalkyleneglycol group (P) and the monomer without a polyalkyleneglycol group that is copolymerizable with the ethylenic unsaturated monomer having a polyalkyleneglycol group (P), with respect to 100 weight % of the copolymer.

3. The binder for an electricity storage device according to claim 1, wherein the copolymer has, as monomer units, 10 to 50 weight % of the ethylenic unsaturated monomer having a polyalkyleneglycol group (P) and the monomer without a polyalkyleneglycol group that is copolymerizable with the ethylenic unsaturated monomer having a polyalkyleneglycol group (P), with respect to 100 weight % of the copolymer.

4. The binder for an electricity storage device according to claim 2, wherein the monomer without a polyalkyleneglycol group comprises the ethylenic unsaturated monomers with an amide group (b2), and at least one monomer selected from the group consisting of ethylenic unsaturated monomers with a carboxyl group (b1) and ethylenic unsaturated monomers with a hydroxyl group (b3), at 0.1 to 10 weight % in total with respect to 100 weight % of the copolymer.

5. The binder for an electricity storage device according to claim 2, wherein the monomer without a polyalkyleneglycol group comprises a crosslinkable monomer (b4).

6. The binder for an electricity storage device according to claim 1, wherein the (meth)acrylic acid ester monomer (b5) is a (meth)acrylic acid ester monomer comprising an alkyl group of 4 or more carbon atoms and a (meth)acryloyloxy group.

7. The binder for an electricity storage device according to claim 6, wherein the (meth)acrylic acid ester monomer (b5) is a (meth)acrylic acid ester monomer comprising an alkyl group of 6 or more carbon atoms and a (meth)acryloyloxy group.

8. The binder for an electricity storage device according to claim 6, wherein the ethylenic unsaturated monomer with a cycloalkyl group (A) is cyclohexyl acrylate or cyclohexyl methacrylate.

9. The binder for an electricity storage device according to claim 1, wherein the binder for an electricity storage device is a binder for formation of a filler porous layer.

10. A slurry for formation of a filler porous layer for an electricity storage device, comprising water, the binder for formation of a filler porous layer according to claim 9, and an inorganic filler.

11. A filler porous layer for an electricity storage device, comprising the binder for formation of a filler porous layer according to claim 9, and an inorganic filler.

12. A separator for an electricity storage device, having the filler porous layer for an electricity storage device according to claim 11.

13. A separator for an electricity storage device, comprising the filler porous layer for an electricity storage device according to claim 11, and a polyolefin porous base material.

14. A lithium-ion secondary battery, comprising the filler porous layer for an electricity storage device according to claim 11.

15. The binder for an electricity storage device according to claim 1, wherein the binder for an electricity storage device is a binder for an electrode.

16. The binder for an electricity storage device according to claim 3, wherein the monomer without a polyalkyleneglycol group comprises ethylenic unsaturated monomers with an amide group (b2), and at least one monomer selected from the group consisting of ethylenic unsaturated monomers with a carboxyl group (b1) and ethylenic unsaturated monomers with a hydroxyl group (b3), at 0.1 to 10 weight % in total with respect to 100 weight % of the copolymer.

17. The binder for an electricity storage device according to claim 3, wherein the monomer without a polyalkyleneglycol group comprises a crosslinkable monomer (b4).

18. The binder for an electricity storage device according to claim 4, wherein the monomer without a polyalkyleneglycol group comprises a crosslinkable monomer (b4).

19. The binder for an electricity storage device according to claim 2, wherein the (meth)acrylic acid ester monomer (b5) is a (meth)acrylic acid ester monomer comprising an alkyl group of 4 or more carbon atoms and a (meth)acryloyloxy group.

20. The binder for an electricity storage device according to claim 3, wherein the (meth)acrylic acid ester monomer (b5) is a (meth)acrylic acid ester monomer comprising an alkyl group of 4 or more carbon atoms and a (meth)acryloyloxy group.

\* \* \* \* \*